(12) United States Patent
Iwasaki

(10) Patent No.: US 10,542,213 B2
(45) Date of Patent: Jan. 21, 2020

(54) IMAGING APPARATUS

(71) Applicant: CANON KABUSHIKI KAISHA, Tokyo (JP)

(72) Inventor: Takahiro Iwasaki, Kiyose (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/651,439

(22) Filed: Jul. 17, 2017

(65) Prior Publication Data

US 2017/0318223 A1 Nov. 2, 2017

Related U.S. Application Data

(63) Continuation of application No. 14/484,062, filed on Sep. 11, 2014, now Pat. No. 9,742,999, which is a
(Continued)

(30) Foreign Application Priority Data

Mar. 15, 2013 (JP) ................................. 2013-053593

(51) Int. Cl.
*H04N 9/80* (2006.01)
*H04N 5/232* (2006.01)
(Continued)

(52) U.S. Cl.
CPC ....... *H04N 5/23245* (2013.01); *G11B 31/006* (2013.01); *H04N 5/23206* (2013.01);
(Continued)

(58) Field of Classification Search
USPC ......................... 386/232, 234, 239, 248, 326
See application file for complete search history.

(56) References Cited

U.S. PATENT DOCUMENTS

| 6,269,122 B1 * | 7/2001 | Prasad | ...................... H04N 5/04 348/425.4 |
| 2007/0292104 A1 * | 12/2007 | Katano | .................. H04N 5/772 386/279 |

(Continued)

FOREIGN PATENT DOCUMENTS

| CN | 1427615 A | 7/2003 |
| CN | 1996474 A | 7/2007 |

(Continued)

*Primary Examiner* — Daquan Zhao
(74) *Attorney, Agent, or Firm* — Canon U.S.A., Inc. IP Division

(57) ABSTRACT

There has been a problem that continuous recording of monitoring data may be impeded by inconsistency in setting values, occurring due to changes in settings of an imaging unit or compression encoding unit performed while recording.

Provided are a recording source which outputs a stream including compression-encoded video data, instructing means which change a parameter relating to the recording source, according to a command transmitted from an external device connected via a network, and control means which perform control so as to switch whether or not a command by the instructing means as to the recording source correlated with the recording job can be accepted, in accordance with the recording state of the recording job.

19 Claims, 27 Drawing Sheets

Related U.S. Application Data continuation of application No. PCT/JP2014/056918, filed on Mar. 14, 2014.

(51) Int. Cl.
*H04N 5/765* (2006.01)
*H04N 5/77* (2006.01)
*H04N 5/91* (2006.01)
*G11B 31/00* (2006.01)
*H04N 5/92* (2006.01)
*H04N 7/18* (2006.01)

(52) U.S. Cl.
CPC .............. *H04N 5/765* (2013.01); *H04N 5/77* (2013.01); *H04N 5/772* (2013.01); *H04N 5/91* (2013.01); *H04N 7/183* (2013.01)

(56) References Cited

U.S. PATENT DOCUMENTS

2012/0281062 A1* 11/2012 Gu ................... H04N 21/44026
348/14.12
2013/0114744 A1* 5/2013 Mutton .................. H04N 19/40
375/240.26

FOREIGN PATENT DOCUMENTS

| | | |
|---|---|---|
| JP | 2007-013881 A | 1/2007 |
| JP | 2012-227602 A | 11/2012 |
| WO | 2009/066795 A1 | 5/2009 |

* cited by examiner

FIG. 5

| | Video Source | | | RebootFlag | Video Encoder Configuration SETTINGS OPTIONS | | |
|---|---|---|---|---|---|---|---|
| VideoSourceMode | MaxResolution | MaxFramerate | Encoding | | COMPRESSION ENCODING FORMAT OPTIONS | Resolution OPTIONS | FramerateLimit SETTABLE RANGE |
| S1 | 3840×2160 | 20 fps | H.264 | False ⇕CONSISTENCY | H.264 | 3840×2160 | 1–20 fps |
| | | | | | | 1920×1080 | |
| | | | | | | 1280×720 | |
| | | | | | | 960×540 | |
| S2 | 3200×2400 | 30 fps | H.264 Or MPEG4 | False ⇕CONSISTENCY | H.264 or MPEG4 | 3200×2400 | 1–30 fps |
| | | | | | | 2048×1536 | |
| | | | | | | 1024×768 | |
| | | | | | | 640×480 | |
| S3 | 1024×768 | 30 fps | H.264 or JPEG | True ⇕CONSISTENCY | H.264 or JPEG | 1024×768 | 1–30 fps |
| | | | | | | 640×480 | |
| | | | | | | 320×240 | |
| | | | | | | 176×144 | |

4000 4001 4002 4003 4004 4005 4006 4007

IMAGING APPARATUS

CROSS-REFERENCE TO RELATED APPLICATIONS

This application is a U.S. application Ser. No. 14/484,062, filed Sep. 11, 2014, which is a Continuation of International Patent Application No. PCT/JP2014/056918, filed Mar. 14, 2014, which claims the benefit of Japanese Patent Application No. 2013-053593, filed Mar. 15, 2013, both of which are hereby incorporated by reference herein in their entirety.

TECHNICAL FIELD

The present invention relates to an imaging apparatus having an imaging unit to record imaged images, and more particularly relates to control for changing settings of the imaging unit based on recording states.

BACKGROUND ART

Conventionally, imaging apparatus which transmit imaged images to a reception device have installed therein a command group, whereby an external device instructs changes to settings of the imaging device and starting of image distribution.

The command group includes a command for an external device to change the resolution of distributed images, which a compression encoding unit of the imaging apparatus generates by encoding image data generated by the imaging unit so as to be distributed to external devices.

There has also been conventionally disclosed an imaging apparatus having the imaging unit and a storage unit, which can realize long-duration recording by controlling so as to store only characteristic images of the imaged multiple images in the storage unit (PTL 1).

CITATION LIST

Patent Literature

PTL 1 Japanese Patent Laid-Open No. 2007-288478

Changing settings such as resolution of the compressing encoding unit while recording distribution images as described above may cause inconsistency, and distribution images may not be able to be generated.

There has been a problem that in cases where such distribution images are being recorded, recording may not be able to be continued, thus impeding continuous recording of monitoring data.

Also, if the resolution or compression encoding format of data being recorded is changed while recording such distribution images, this results in multiple types of recording data being included in a single recorded file, and the recorded file may not be able to be played properly.

SUMMARY OF INVENTION

In order to sole the above-described problems, an imaging apparatus according to the present invention includes: a recording source which outputs a stream including compression-encoded video data; a recording file recording the stream which the recording source outputs; a recording job which correlates the recording source and the recording file, and manages a recording state; instructing means which change a parameter relating to the recording source, according to a command transmitted from an external device connected via a network; and control means which perform control so as to switch whether or not a command by the instructing means as to the recording source correlated with the recording job can be accepted, in accordance with the recording state of the recording job.

Further features of the present invention will become apparent from the following description of exemplary embodiments with reference to the attached drawings.

BRIEF DESCRIPTION OF DRAWINGS

FIG. 5 is a table illustrating a dependency relationship between an imaging unit and compression encoding unit according to the first embodiment of the present invention.

DESCRIPTION OF EMBODIMENTS

The following is a description of embodiments of the present invention.

First Embodiment

Conventionally, imaging apparatus which transmit imaged images to a reception device have installed therein a command group, whereby an external device instructs changes to settings of the imaging device and starting of image distribution. An example of such a command group is one defined by a standard developed by ONVIF (Open Network Video Interface Forum), which will be assumed here.

The present embodiment is made assuming that the command group includes a command for an external device to change the resolution of image data, which an imaging unit of an imaging apparatus generates. The command group in the present embodiment also includes a command to change the resolution of distribution images, at the time of a compression encoding unit of the imaging apparatus generating distribution image for distribution to an external device, by encoding image data generated by the imaging unit.

For example, assumption will be made that the aforementioned ONVIF standard includes a SetVideoSourceMode command as the former command, and a SetVideoEncorderConfiguration command as the latter command.

In a case of changing settings such as resolution or the like of the imaging unit or compressing encoding unit while recording distribution images as described above, this may cause inconsistency in the combination of the two, and distribution images may not be able to be generated.

For example, assumption will be made regarding a case where the output resolution of the imaging unit is 1600×1200 pixels (resolution aspect ratio 4:3), and the output resolution of the compression encoding unit is 1280×1024 pixels (resolution aspect ratio 4:3).

In such a case, changing the output resolution of the imaging unit to 1920×1080 (Full HD, resolution aspect ratio 16:9) the compression encoding unit which is set to an resolution aspect ratio (resolution aspect ratio 4:3) which is inconsistent with this cannot generate distribution images.

There has been a problem that in cases where such distribution images are being recorded, recording may not be able to be continued, thus impeding continuous recording of monitoring data.

Also, if the resolution or compression encoding format of data being recorded is changed while recording such distribution images, this results in multiple types of recording data being included in a single recorded file, and the recorded file may not be able to be played properly.

Figure 1:
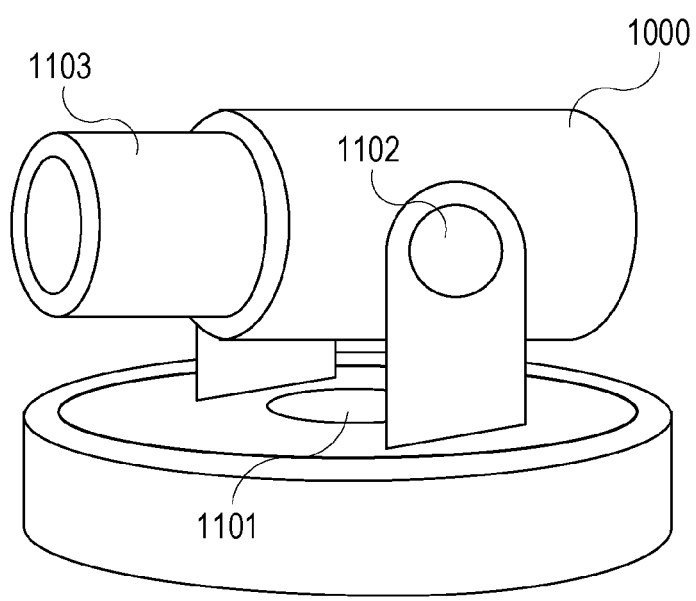
FIG. 1 is an external view of a monitoring camera according to a first embodiment of the present invention.

Reference numeral 1000 in FIG. 1 is a diagram illustrating a monitoring camera according to an embodiment of the present invention. Reference numeral 1101 denotes a panning mechanism which pans the lens direction of the monitoring camera 1000. Reference numeral 1102 denotes a tilting mechanism which tiles the lens direction. Reference numeral 1103 denotes a zooming mechanism which changes the zoom power of the lens.

Figure 2:
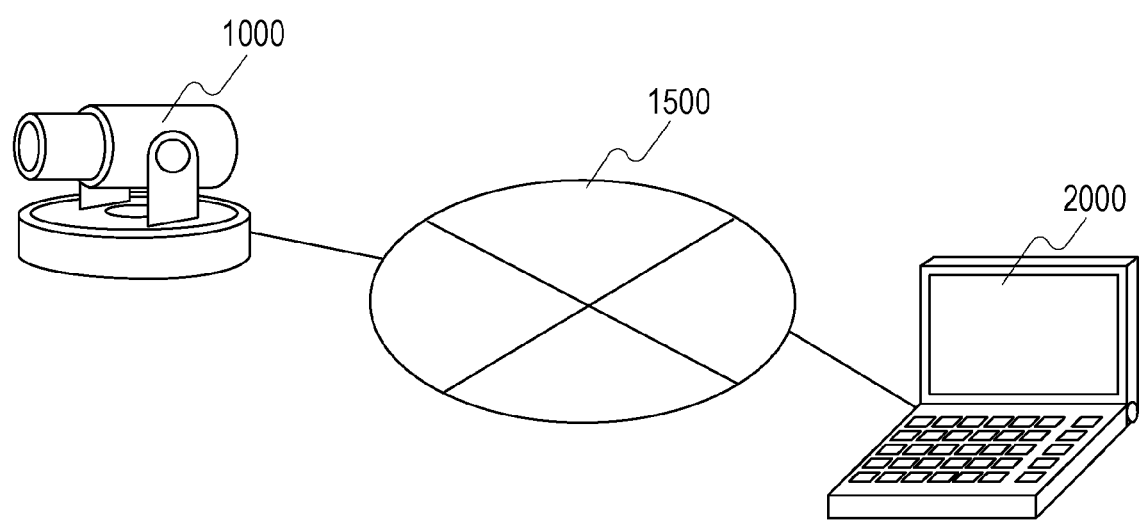
FIG. 2 is a system configuration diagram including the monitoring camera according to the first embodiment of the present invention.

Next, FIG. 2 is a system configuration diagram including the monitoring camera 1000. Reference numeral 2000 denotes a client device, which is the external device in the present embodiment. The monitoring camera 1000 and the client device 2000 are communicably connected to each other over an IP network 1500.

The client device 2000 transmits to the monitoring camera 1000 various types of commands, such as later-described changes to imaging parameters, and instructions for driving of a camera platform, starting video streaming, and so forth. The monitoring camera 1000 transmits responses to the commands and streaming video to the client device 2000.

Figure 3:
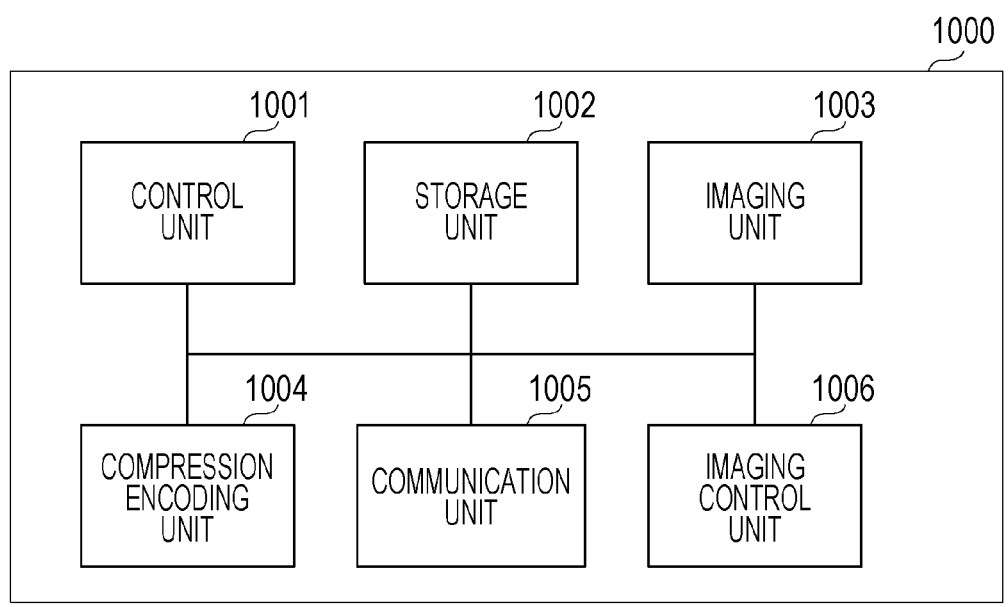
FIG. 3 is a block diagram illustrating the internal configuration of the monitoring camera according to the first embodiment of the present invention.

Next, FIG. 3 is a block diagram illustrating the internal configuration of the monitoring camera 1000. In FIG. 3, Reference numeral 1001 denotes a control unit which centrally controls the components making up the monitoring camera 1000.

Reference numeral 1002 denotes a storage unit. The storage unit 1002 is primarily used as a storage region for various types of data, such as a storage region for programs which the control unit 1001 executes, a work region for programs being executed, a storage region for image data which a later-described imaging unit 1003 generates, and so forth.

Reference numeral 1003 denotes an imaging unit. This imaging unit 1003 converts analog images obtained by shooting a subject into digital data, and outputs to the storage unit 1002 as an imaged image.

The imaging unit 1003 supports multiple VideoSourceModes to change resolution of image data to be output, frame rate, and compression encoding format which can be used. These VideoSourceModes can be switched by a later-described SetVideoSourceMode command.

Reference numeral 1004 denotes a compression encoding unit. The compression encoding unit 1004 generates image data by performing compression encoding processing as to an imaged image output from the imaging unit 1003, based on a format such as JPEG or H.264 or the like, and outputs to the storage unit 1002. There is a dependency relationship such as illustrated in FIG. 5 which will be described later, between the types of resolution of image data which the compression encoding unit 1004 outputs and the modes of the imaging unit 1003.

Reference numeral 1005 denotes a communication unit. This communication unit 1005 is used in cases of receiving control commands from an external device, and in cases of transmitting responses as to the control commands to the external device.

Reference numeral 1006 denotes an imaging control unit. The imaging control unit 1006 is used to control the tilting mechanism 1101, panning mechanism 1102, and zooming mechanism 1003, based on pan angle, tilt angle, and zoom power values input from the control unit 1001. The imaging control unit 1006 also provides the current pan angle value, tilt angle value, and zoom power value of the monitoring camera 1000, in response to inquiry from the control unit 1001.

While an internal configuration of the monitoring camera 1000 has been described with reference to FIG. 2, the processing blocks illustrated in FIG. 2 are only illustrate an example of a preferred embodiment of a security camera according to the present invention, and are not restrictive. Various modifications and alterations may be made within the scope of the essence of the present information, such as providing an audio input unit, omitting the imaging control unit, and so forth.

The names and contents of the commands, parameters, and so forth, used in the present embodiment, will be described below.

Figure 4:
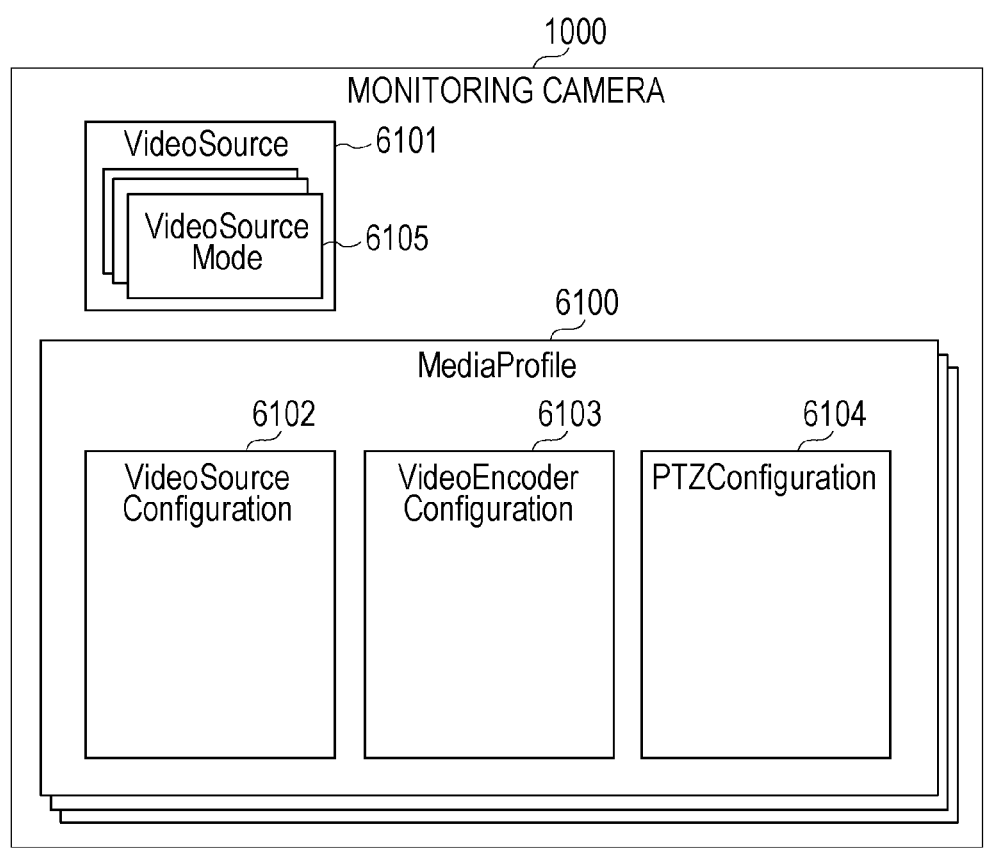
FIG. 4 is a diagram illustrating the structure of parameters which the monitoring camera holds according to the first embodiment of the present invention.

Next, FIG. 4 illustrates the structure of parameters which the monitoring camera 1000 according to the present embodiment holds.

A MediaProfile 6100 is a parameter set for storing setting items for the monitoring camera in a correlated manner. The MediaProfile 6100 includes a Profile Token which is the ID of the MediaProfile 6100, a VideoSourceConfiguration 6102, and a VideoEncoderConfiguration 6103.

The MediaProfile 6100 also holds a PTZConfiguration 6104, and further links to various types of setting items, including audio encoders and so forth. That is to say, these links correlate the MediaProfile 6100 to the PTZConfiguration 6104 and also to various types of setting items, including audio encoders and so forth.

VideoSource 6101 is a set of parameters indicating capabilities of one imaging unit 1003 which the monitoring camera 1000 includes. This VideoSource 6101 includes a VideoSourceToken which is the ID of the VideoSource 6101, and a Resolution indicating the resolution of image data which the imaging unit 1003 is capable of outputting.

Note that Resolution in the present embodiment corresponds to resolution settings.

The VideoSource 6101 also supports multiple of VideoSourceMode 6105 including the maximum resolution of image data which the imaging unit 1003 is capable of outputting, frame rate, and available compression encoding format. That is to say, a VideoSource 6101 is correlated with one of the multiple VideoSourceMode 6105.

Further, the VideoSourceMode correlated with the VideoSource 6101 can be switched by a SetVideoSourceMode command. This VideoSourceMode 6105 will be described later. Note that hereinafter, VideoSourceMode may be abbreviated to VSM.

The VideoSourceConfiguration 6102 is a set of parameters correlating the VideoSource 6101 of the monitoring camera 1000 with the MediaProfile 6100. The VideoSourceConfiguration 6102 includes Bounds, which is data to specify which part of image data output from the VideoSource 6101 is to be cut out and used as distribution images.

The VideoEncoderConfiguration 6103 is a set of parameters correlating encoder settings relating to compression encoding of image data to the MediaProfile 6100.

The imaging unit 1003 in monitoring camera 1000 outputs image data based on the VideoSource 6101 and the VideoSourceConfiguration 6102.

The output image data is subjected to compression encoding following parameters such as the compression encoding format set to this VideoEncoderConfiguration 6103 (e.g., JPEG or H.264), frame rate, resolution, or the like. The image data thus compression-encoded is distributed to client devices 2000 via the communication unit 1005.

The VideoEncoderConfiguration 6103 includes a VideoEncoderConfigurationToken which is the ID of the VideoEncoderConfiguration 6103.

The VideoEncoderConfiguration 6103 also includes Encoding for specifying a compression encoding format, and Resolution for specifying the resolution of the output image from the monitoring camera 1000. Note that Encoding in the present embodiment corresponds to compression encoding format settings.

Further, the VideoEncoderConfiguration 6103 includes Quality for specifying the compression encoding quality, and FramerateLimit for specifying the maximum frame rate of the output images from the monitoring camera 100. Moreover, the VideoEncorderConfiguration 6103 includes a BitrateLimit for specifying the maximum bitrate.

Hereinafter, VideoEncoderConfiguration may be abbreviated to VEC.

The PTZConfiguration 6104 is a set of parameters correlating the settings relating to the panning mechanism 1101, tilting mechanism 1102, and zooming mechanism 1103 of the monitoring camera 1000, with the MediaProfile 6100. The PTZConfiguration 6104 includes information relating to a coordinates system representing the actual pan/tilt angle values and zoom power value of the panning mechanism, tilting mechanism, and zooming mechanism.

Next, the VSMs which the monitoring camera 1000 supports, and the setting contents of the VECs 6103 consistent with each VSM will be described with reference to FIG. 5. FIG. 5 here is a table to describe the dependency relationship between the imaging unit 1003 and the compression encoding unit 1004.

The table illustrated in FIG. 5 is stored in the storage unit 1002 in the monitoring camera 100 beforehand, and is referenced by the control unit 1001 as needed.

Reference numeral 4000 in FIG. 5 denotes the mode No. of the VSM which the monitoring camera 1000 uses for internal processing. The monitoring camera 1000 according to the present embodiment supports three VSMs, namely S1, S2, and S3. That is to say, the monitoring camera 1000 holds these three VSMs in the storage unit 1002.

Reference numeral 4001 denotes a MaxResolution parameter representing the greatest resolution which the imaging unit 1003 can output in each VSM. Reference numeral 4002 denotes a MaxFramerate parameter which represents the greatest frame rate which the imaging unit 1003 can output in each VSM.

Reference numeral 4003 denotes an Encoding parameter representing the compression encoding formats available for the VEC in each VSM. Reference numeral 4004 denotes a RebootFlag parameter representing whether or not the imaging unit 1003 needs to be restarted at the time of switching to each VSM.

For example, when there is occurrence of switching to a VSM correlated with a RebootFlag 4004 of which the value is True, by a SetVideoSourceMode command, restart processing of the monitoring camera 1000 occurs.

In addition to the parameters 4000 through 4003, the VSMs include an Enables flag. The Enabled flag of a valid VSM currently set to the imaging unit 1003 is set to True, and the value of the other Enabled flags is set to False.

Reference numerals 4005 through 4007 indicate the settable ranges and options for the parameters of the VEC 6103 which can be set thereto from an external device by the SetVideoEncoderConfiguration command, for each VSM.

Reference numeral 4005 denotes compression encoding format options. For example, this indicates that in a case where the VSM is S1, this shows that only H.264 is selectable as a compression encoding format.

Reference numeral 4006 denotes options for Resolution, which is the resolution of the VEC. This settings value determines the resolution of the distribution image which the compression encoding unit 1004 outputs. For example, this indicates that in a case where the VSM is S2, the resolutions of 3200×2400, 2048×1536, 1024×768, and 640×480 are selectable.

Reference numeral 4007 denotes the settable range for the FramerateLimit of the VEC. For example, this indicates that in a case where the VideoSourceMode is S3, the settable FramerateLimit is 1 to 30 fps.

These options 4005, 4006, and 4007 are notified from the monitoring camera 1000 to the external device by the GetVideoEncoderConfigurationOptions command.

Figure 6:
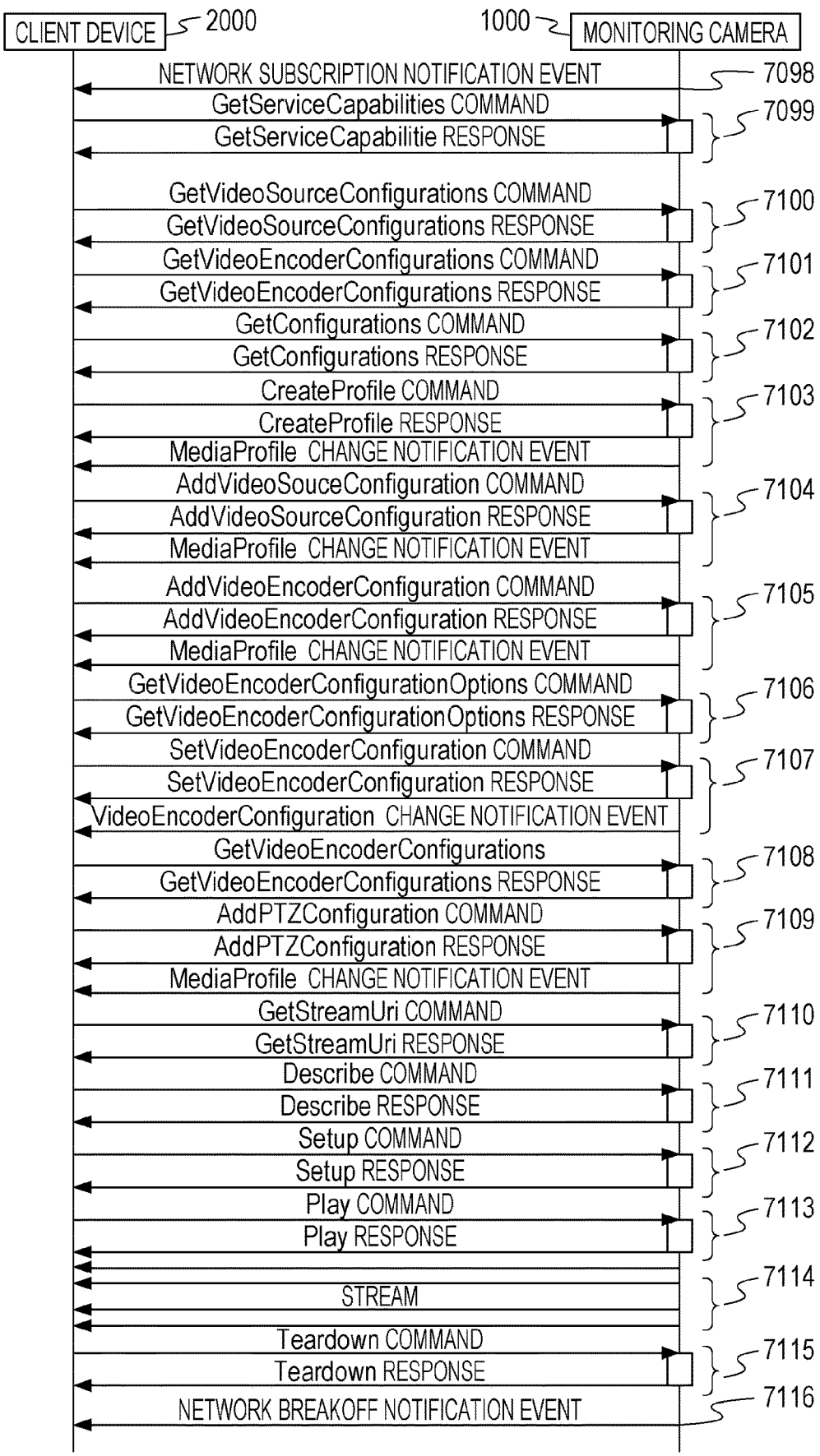
FIG. 6 illustrates a command sequence carried out between the monitoring camera and a client device, according to the first embodiment of the present invention.

FIG. 6 illustrates a typical command sequence between the monitoring camera 1000 and client device 2000, from start of setting to video distribution. Here, the term transaction means the pair of a command transmitted from the client device 2000 to the monitoring camera 1000, and a response returned from the monitoring camera 1000 to the client device 2000.

Reference numeral 7098 denotes a network subscription notification event. The monitoring camera 1000 transmits this event to the network by multicasting, to indicate that it is now capable of receiving commands, to external devices connected to this network.

Reference numeral 7099 denotes a GetServiceCapabilities command transaction. The GetServiceCapabilities command is a command instructing the monitoring camera 1000 to return capabilities information indicating the capabilities which the monitoring camera 1000 supports.

This capabilities information includes information indicating whether or not the monitoring camera 1000 is compatible with VSM switching.

Reference numeral 7100 denotes a GetVideoSourceConfigurations command transaction. The client device 2000 uses this command to obtain a VideoSourceConfiguration 6102 list which the monitoring camera 1000 holds.

Reference numeral 7101 denotes a GetVideoEncoderConfigurations command transaction. The client device 2000 uses this command to obtain a VEC 6103 list which the monitoring camera 1000 holds.

Reference numeral 7102 denotes a GetConfigurations command transaction. The client device 2000 uses this command to obtain a PTZConfiguration 6104 list which the monitoring camera 1000 holds.

Reference numeral 7103 denotes a CreateProfile command transaction. The client device 2000 uses this command to create a new MediaProfile 6100 for the monitoring camera 1000, and obtains a ProfileToken thereof.

After processing of these commands, the monitoring camera 1000 transmits a MediaProfile change notification event, to notify client devices on the network that there has been some sort of change to the MediaProfile.

Reference numeral 7104 denotes an AddVideoSourceConfigruation command transaction. Reference numeral 7105 denotes an AddVideoEncoderConfigruation command transaction. Reference numeral 7109 denotes an AddPTZConfiguration command transaction.

Specifying IDs in these commands enables the client device 2000 to correlate the desired VideoSourceConfiguration, VEC, and PTZConfiguration, with the MediaProfile specified by this ID.

After processing of these commands, the monitoring camera 1000 transmits a MediaProfile change notification event, to notify client devices on the network that there has been some sort of change to the MediaProfile.

Reference numeral 7106 denotes a GetVideoEncoderConfigurationOptions command transaction. This command enables the client device 2000 to obtain options and settable value ranges of the parameters which the monitoring camera 1000 can accept in the VEC specified by the ID.

Reference numeral 7107 denotes a SetVideoEncoderConfiguration command transaction. The client device 2000 uses this command to set the parameters of the VideoEncoderConfiguration 6103. After processing of these commands, the monitoring camera 1000 transmits a VEC change notification event, to notify client devices on the network that there has been some sort of change to the VEC.

Reference numeral 7110 denotes a GetStreamUri command transaction. The client device 2000 uses this command to obtain an address (URI) for the monitoring camera 1000 to obtain a distribution stream based on the settings of the specified MediaProfile.

Reference numeral 7111 denotes a Describe command transaction. The client device 2000 executes this command using the URI obtained in 7110 to request and obtain information regarding the contents of which the monitoring camera 1000 performs streaming distribution.

Reference numeral 7112 denotes a Setup command transaction. The client device 2000 executes this command using the URI obtained in 7110, whereby the monitoring camera 1000 and client device 2000 can share the stream transmission method including session Nos. therebetween.

Reference numeral 7113 denotes a Play command transaction. The client device 2000 executes this command using the session No. obtained in 7112 to request the monitoring camera 1000 to start the stream.

Reference numeral 7114 denotes a distribution stream. The monitoring camera 1000 distributes the stream of which starting has been requested in 7113 by the transmission method shared in 7112.

Reference numeral 7115 denotes a Teardown command transaction. The client device 2000 requests the monitoring camera 1000 to stop the stream, by executing this command using the session No. obtained in 7112.

Reference numeral 7116 denotes a network breakoff notification event. The monitoring camera 1000 transmits this event to the network by multicasting, to indicate that it is now incapable of receiving commands, to external devices connected to this network.

Figure 7:
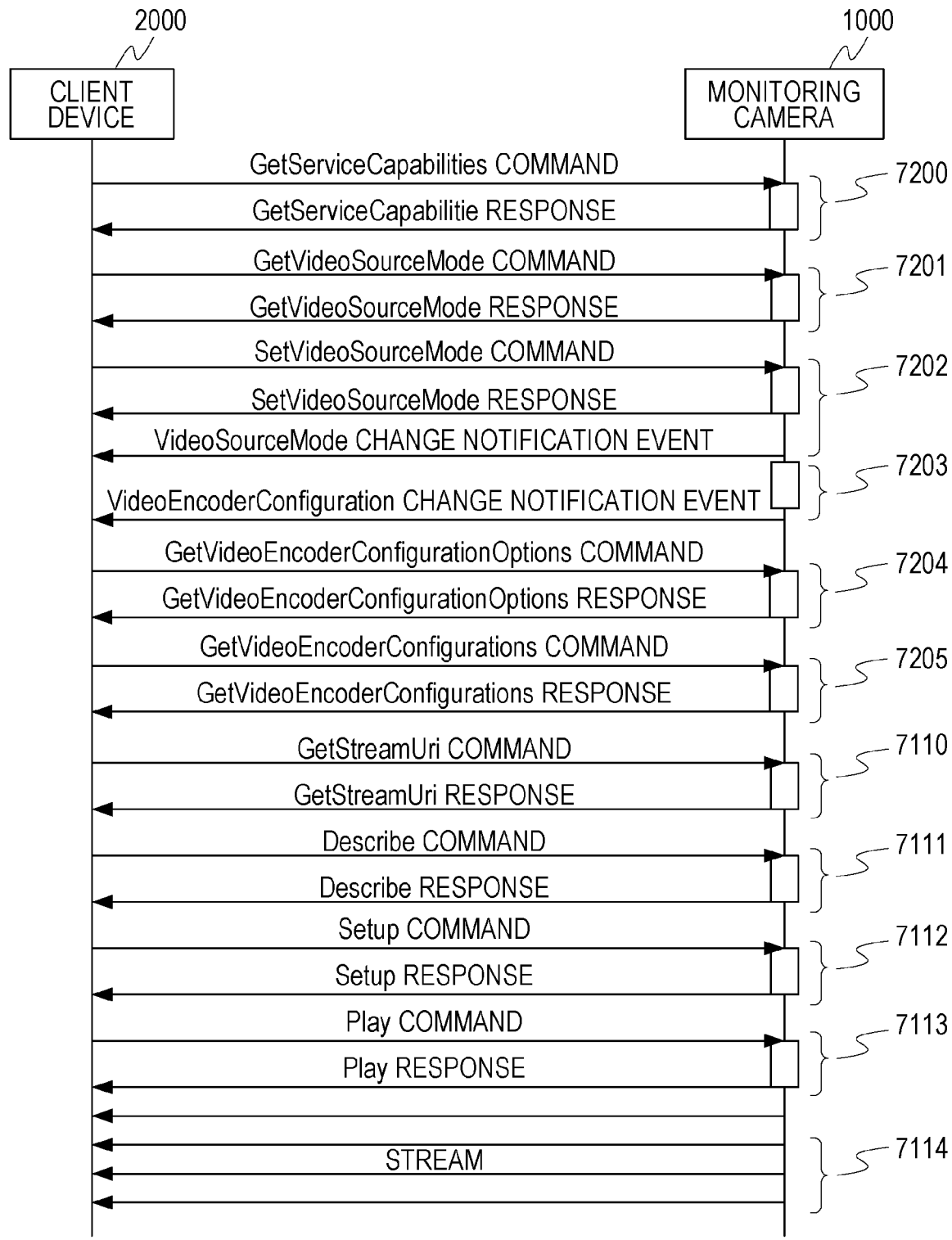
FIG. 7 illustrates a command sequence carried out between the monitoring camera and a client device, which does not involve restarting, according to the first embodiment of the present invention.

FIG. 7 illustrates a typical command sequence carried out between the monitoring camera 1000 and client device 2000, in a case performing a VSM mode change which does not involve restarting.

Reference numeral 7200 denotes a GetServiceCapabilities command transaction. The GetServiceCapabilities command is a command instructing the monitoring camera 1000 to return capabilities information indicating the capabilities which the monitoring camera 1000 supports. The capabilities information includes information indicating whether or not the monitoring camera 1000 is compatible with VSM switching.

Reference numeral 7201 denotes a GetVideoSourceMode command transaction. The GetVideoSourceMode command is a command instructing the monitoring camera 1000 to return list of VSMs supported by the VideoSource 6101 having the ID which the client device 2000 has specified.

In a case where the client device 2000 has determined that the monitoring camera 1000 is compatible with VSM switching by the GetServiceCapabilities command 7200, the client device 2000 uses this command to obtain the VSMs which the monitoring camera 1000 supports.

Upon receiving the GetVideoSourceMode command, the control unit 1001 of the monitoring camera 1000 obtains the parameters of each of the VSMs S1 through S3 illustrated in FIG. 5, that are saved in the storage unit 1002, and returns these to the client device 2000 via the communication unit 1005.

Reference numeral 7202 denotes a SetVideoSourceMode command transaction. The SetVideoSourceMode command is a command instructing the monitoring camera 1000 to switch the VSM of the VideoSource 6101 specified by the client device 2000. After switching the VSM, the control unit 1001 of the monitoring camera 1000 transmits a VSM change notification event to notify the client devices on the network of the VSM change.

Reference numeral 7203 denotes processing of updating inconsistency occurring between the VideoSourceMode and VEC by switching of the SetVideoSourceMode illustrated in 7202. In a case where this update has been performed, the control unit 1001 of the monitoring camera 1000 transmits a VEC change notification event, and notifies the client devices on the network of the VEC settings values and re-obtaining of settings value options of the VEC.

Reference numerals 7204 and 7205 denote GetVideoEncoderConfigurationOptions command and GetVideoEncoderConfigurations command transactions. The client device 2000, which has received the VEC change notification event illustrated in 7203 obtains the updated VEC settings values and the VEC settings value options, using these commands.

Figure 8:
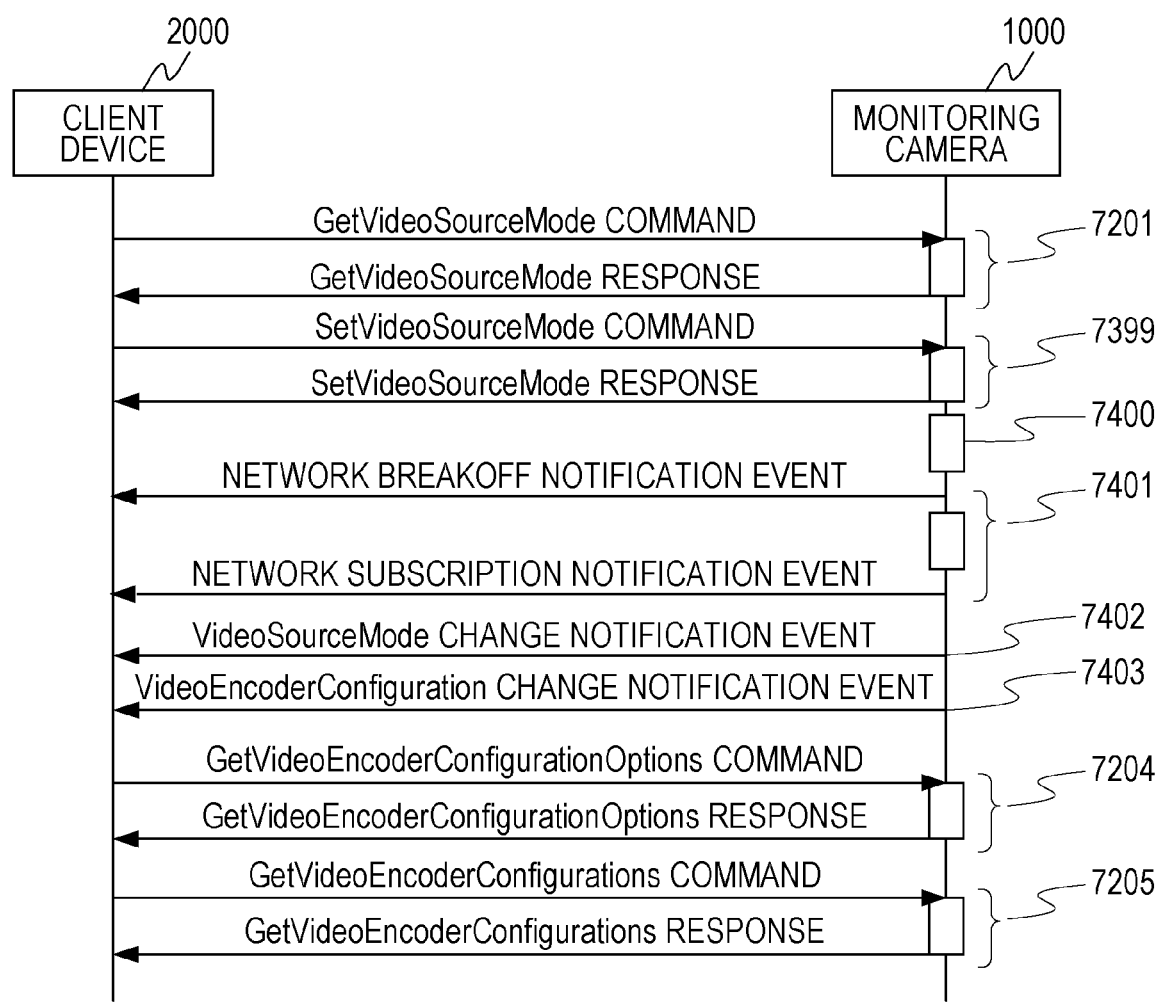
FIG. 8 illustrates a command sequence carried out between the monitoring camera and a client device, which involves restarting, according to the first embodiment of the present invention.

FIG. 8 illustrates a typical command sequence carried out between the monitoring camera 1000 and client device 2000, in a case performing a VSM mode change which involves restarting. FIG. 8 is the same as FIG. 7 regarding portions of 7201 and earlier, and 7204 and later.

Reference numeral 7399 denotes a SetVideoSourceMode command transaction for a VSM change needing restarting. In this case, the monitoring camera 1000 does not transmit the VSM change notification event at this timing.

Reference numeral 7400 denotes processing of updating inconsistency occurring between the VSM and VEC by switching of the SetVideoSourceMode illustrated in 7399. In this case, the monitoring camera 1000 does not transmit the VEC change notification event at this timing.

Reference numeral 7401 denotes restarting processing of the monitoring camera 1000. The monitoring camera 1000 transmits a network breakoff notification event, performs restarting processing and transmits a network subscription notification event.

Reference numerals 7402 and 7403 denote a VSM change notification event and a VEC change notification event. The monitoring camera 1000 transmits these events after restarting, and prompts the client device 1000 to re-obtain the settings values.

Figure 13:
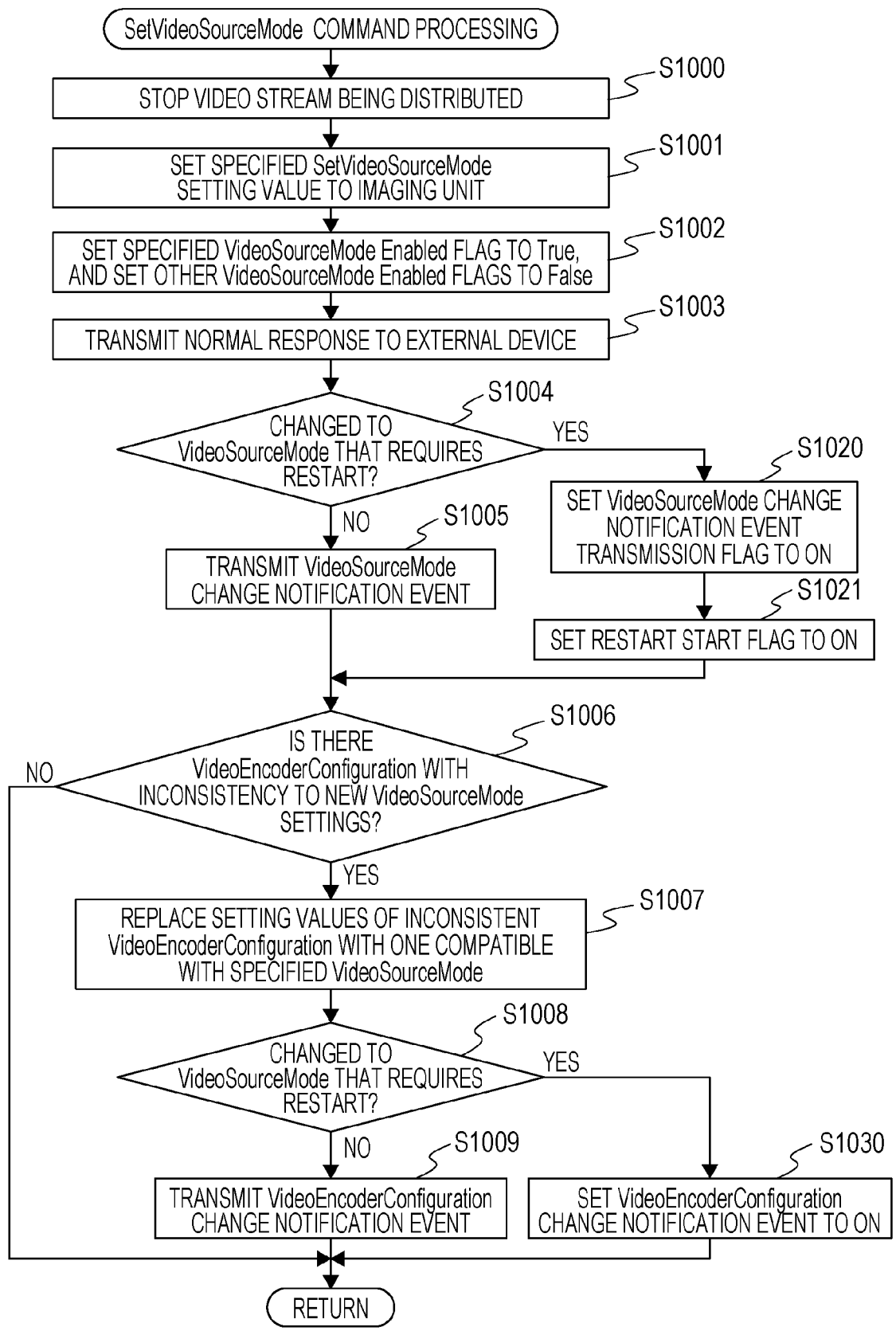
FIG. 13 is a flowchart for describing a SetVideoSourceMode command processing according to the first embodiment of the present invention.

FIG. 13 illustrates a case of the monitoring camera 1000 receiving the SetVideoSourceMode command from the client device 2000.

That is to say, in a case of determining that the SetVideoSourceMode command has been received from the client device, the control unit 1001 starts this processing. On the other hand, in a case of determining that the SetVideoSourceMode command has not been received from the client device 2000, the control unit 1001 does not start this processing.

In step S1000, the control unit 1001 stops the video stream being distributed, via the communication unit 1005.

In step S1001, the control unit 1001 distinguishes which of S1 through S3 of the VSM which has been input is, obtains settings values of the relevant VSM from the storage unit 1002, and sets the obtained VSM settings values to the imaging unit 1003.

That is to say, The control unit 1001 first reads out, from the storage unit 1002, the settings values of the VSM specified in the SetVideoSourceMode command received from the client device 2000, and sets the settings values which have been read out to the imaging unit 1003.

In step S1002, the control unit 1001 sets the Enable flag corresponding to the VSM distinguished in step S1001 to True, and sets the Enable flags corresponding to the other VSMs to False.

In step S1003 the control unit 1001 transmits a normal response to the client device 2000.

In step S1004, the control unit 1001 references the RebootFlag of the VSM regarding which the settings values have been set in step S1001, and determines whether or not the VSM has been switched to a VSM necessitating restarting. In a case where determination is made that restarting is necessary, the control unit 1001 advances the flow to step S1020, and in a case where determination is made that restarting is not necessary, to step S1005.

In step S1005 the control unit 1001 transmits a VSM change notification event via the communication unit 1005, so as to notify the client device 2000 on the network of the VSM change.

In step S1020, the control unit 1001 sets a VSM change notification event transmission flag to ON. The control unit 1001 references this flag in later-described restarting processing.

In step S1021, the control unit 1001 sets the restarting start flag to ON. The control unit 1001 references this flag after processing of the commands has ended, and in a case where the flag is ON, the control unit 1001 executes restarting processing following processing of the commands.

In step S1006, the control unit 1001 references the table illustrated in FIG. 5, which is stored in the storage unit 1003, and determines consistency between information set to all VECs that are stored, and the options 4005, 4006, and 4007 of VECs corresponding to the current VSM. This information here is compression encoding format Encoding, resolution, and maximum frame rate FramerateLimit.

In a case where there is even one VEC incompatible with these options, the control unit 1001 advances the flow to S1007, and otherwise ends the processing of this command.

In step S1007 the control unit 1001 changes the parameters of the VEC regarding which there has been the inconsistency in step S1006, to contents which are consistent. Various implementations are conceivable for the method of changing.

For example, assumption will be made that there is a VideoEncoderConfiguration where, when VSM=S3, Encoding=JPEG, Resultion=320×240, and FramerateLimit=25 fps.

In a case where the VSM is changed from S3 to S1 at this time, the Encoding in the VideoEncorderConfiguration may be changed from JPEG to H.264. Also, in a case where the VSM is changed from S3 to S1 at this time, the Resolution in the VideoEncorderConfiguration may be changed from 320×240 to 960×540.

Further, in a case where the VSM is changed from S3 to S1 at this time, the FramerateLimit in the VideoEncorderConfiguration may be changed from 25 fps to 20 fps.

In a case where inconsistency has occurred in Encoding for example, change may be made to that at the top of a list of Encoding consistent with the new VSM.

In a case where inconsistency has occurred in Resolution for example, change may be made to that at the same order in a list of Resolution consistent with the current VSM. That is to say, when change is made from VSM=S3 to S1 the resolution of the VSM specified to 1024×768 which is the top order of resolution options for S3, may be changed to 3840×2160 which is the Resolution which is the top order of resolution options for S1.

In a case where inconsistency has occurred in FramerateLimit for example, change may be made to the nearest value of those consistent with the new VSM. That is to say, when change is made from VSM=S2 to S1, the FramerateLimit which was 28 fps in S2 may be changed to 20 fps in S1.

In step S1008, the control unit 1001 determines whether or not the new VSM suggests necessitating restarting. In a case where restarting is unnecessary, the flow advances to step S1009, and in a case where restarting is necessary, the flow advances to step S1030.

In step S1009 the control unit 1001 transmits a VEC change notification event via the communication unit 1005, so as to notify the client devices on the network of the VEC change.

In step S1020, the control unit 1001 sets a VEC change notification event transmission flag to ON. The control unit 1001 references this flag in later-described restarting processing.

Figure 14:
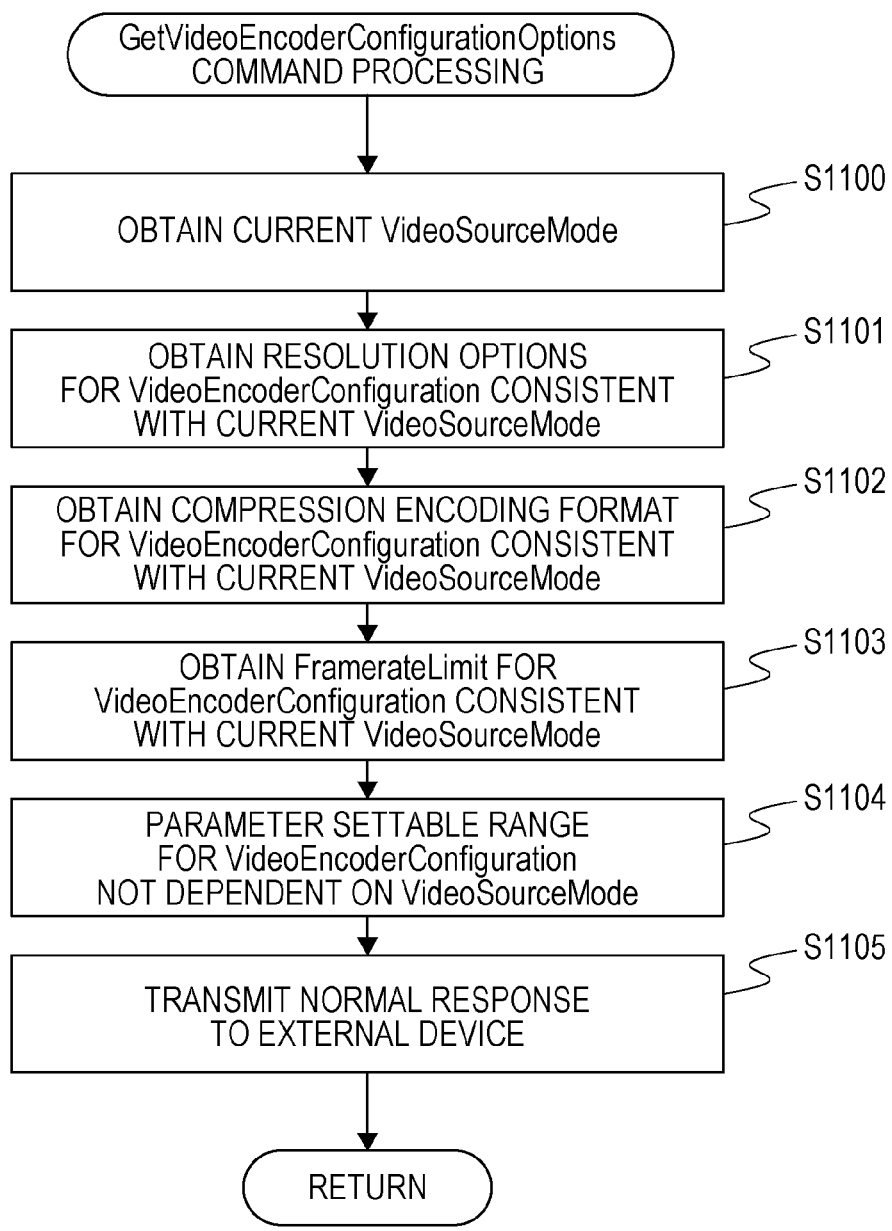
FIG. 14 is a flowchart for describing processing in a case where the monitoring camera receives a GetVideoEncorderConfigurationOptions command, according to the first embodiment of the present invention.

Next, FIG. 14 illustrates processing in a case where the monitoring camera 1000 has received the above-described GetVideoEncoderConfigurationOptions command from the client device 2000.

In step S1100 the control unit 1001 distinguishes which of S1 through S3 the VSM set to the current VideoSource 6101 is, by referencing the Enable flag.

In steps S1101, S1102, and S1103, the control unit 1001 references the table in FIG. 5 that is stored in the storage unit 1002, and obtains the options of the compression encoding formats Encoding, consistent with the current VSM. The control unit 1001 also references the table in FIG. 5 that is stored in the storage unit 1002, and obtains the options of the resolution of the VEC, and the options of the maximum frame rate FramerateLimit, consistent with the current VSM.

For example, in a case where the current VSM is S3, H.264 and JPEG are obtained as options for the compression encoding format Encoding, and 1024×768, 640×480, 320×240, and 176×144 as options for Resolution. Also, in a case where the current VSM is S3, 1 to 30 fps is obtained as the FramerateLimit.

In step S1104, the control unit 1001 obtains options and setting ranges of a VEC not dependent on the current VSM, from the storage unit 1002. For example, 1 to 5 is obtained as a settable range for Quality, and 1 to 60 Mbps as the BitrateLimit.

In step S1105, the control unit 1001 includes the options and setting ranges obtained in step S1101 through step S1104 in a normal response, and returns this to the client device 2000 via the communication unit 1005.

Figure 15:
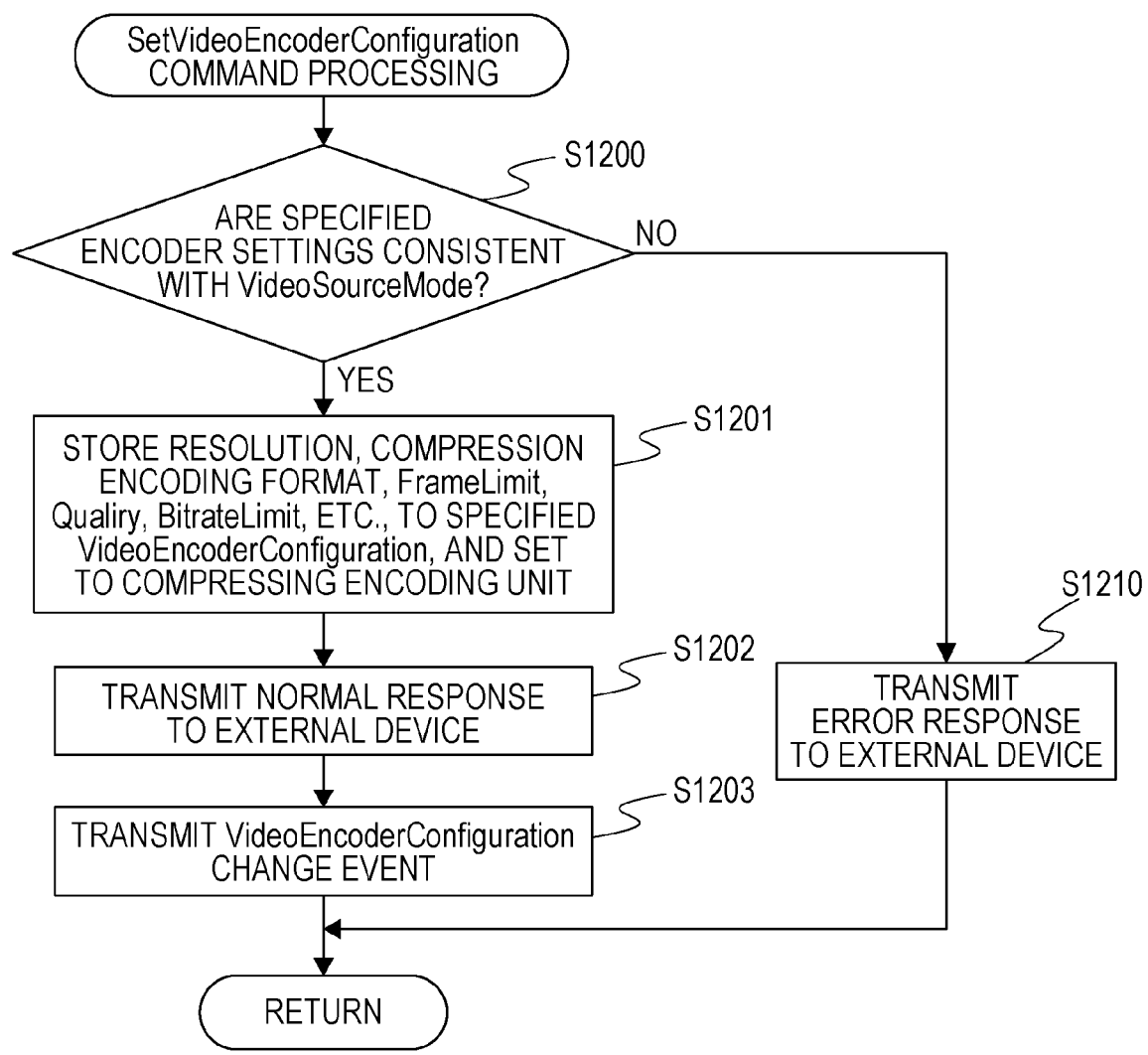
FIG. 15 is a flowchart for describing processing in a case where the monitoring camera receives a SetVideoEncorderConfigurations command, according to the first embodiment of the present invention.

Next, FIG. 15 illustrates processing in a case where the monitoring camera 1000 has received the above-described SetVideoEncoderConfiguration command from the client device 2000.

In step S1200, the control unit 1001 references the table illustrated in FIG. 4, which is stored in the storage unit 1003, and determines whether or not information input in the SetVEC received by this command is consistent with the current VSM. This information is the resolution Resolution, compression encoding format Encoding, and FramerateLimit.

In a case where even one information in this information is not is inconsistent, the control unit 1001 advances the flow to step S1210.

In step S1201, the control unit 1001 stores the settings values of the VEC received by this command in the storage unit 1002, and sets to the compression encoding unit 1004. Note that this command includes Quality, Quality, BitrateLimit, Encoding, FramerateLimit, and Resolution.

In step S1202, the control unit 1001 transmits a normal response to the client device 2000.

In step S1203, the control unit 1001 transmits a VEC change notification event via the communication unit 1005, so as to notify the VEC change to the client devices on the network.

In step S1210, the control unit 1001 transmits an error response to the client device 200.

Figure 16:
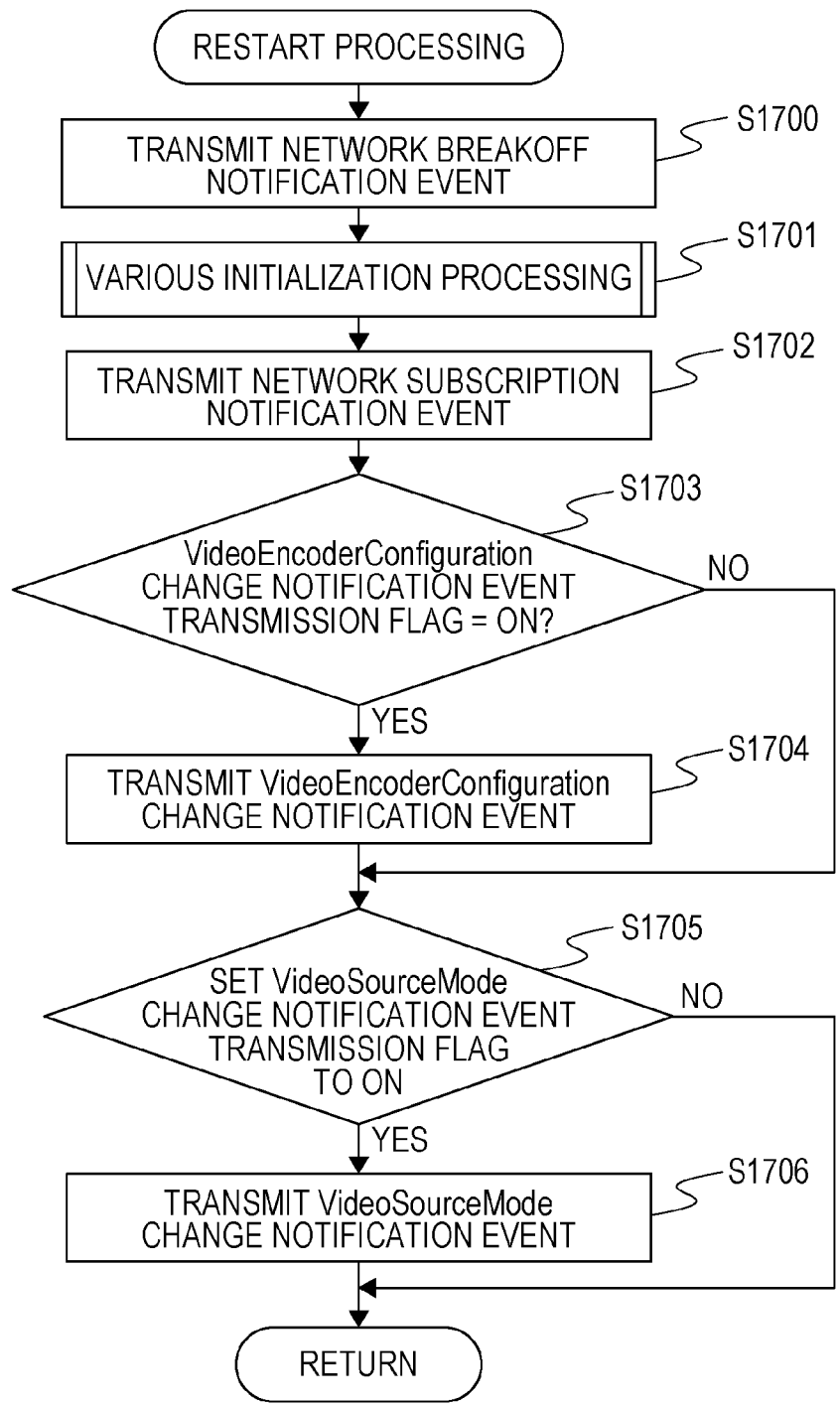
FIG. 16 is a flowchart for describing monitoring camera restarting processing according to the first embodiment of the present invention.

Next, FIG. 16 is restarting processing. This processing is processing executed by the control unit 1001 in a case where the restarting start flag is ON immediately after reception processing of the commands.

In step S1700, the control unit 1001 transmits a network breakoff notification event via the communication unit 1005, so as to notify starting of restarting to the client devices on the network.

In step S1701, the control unit 1001 performs the actual restarting processing of the monitoring camera 1000.

In step S1702, the control unit 1001 transmits a network subscription notification event via the communication unit 1005, so as to notify completion of restarting to the client devices on the network.

In step S1703, the control unit 1001 determines the VEC change notification transmission flag. If ON, the flow advances to step S1704.

In step S1704, the control unit 1001 transmits a VEC change notification event via the communication unit 1005, so as to notify the VEC change to the client devices on the network.

In step S1705, the control unit 1001 determines the VSM change notification transmission flag. If ON, the flow advances to step S1706.

In step S1706, the control unit 1001 transmits a VSM change notification event via the communication unit 1005, so as to notify the VSM change to the client devices on the network.

Figure 21:
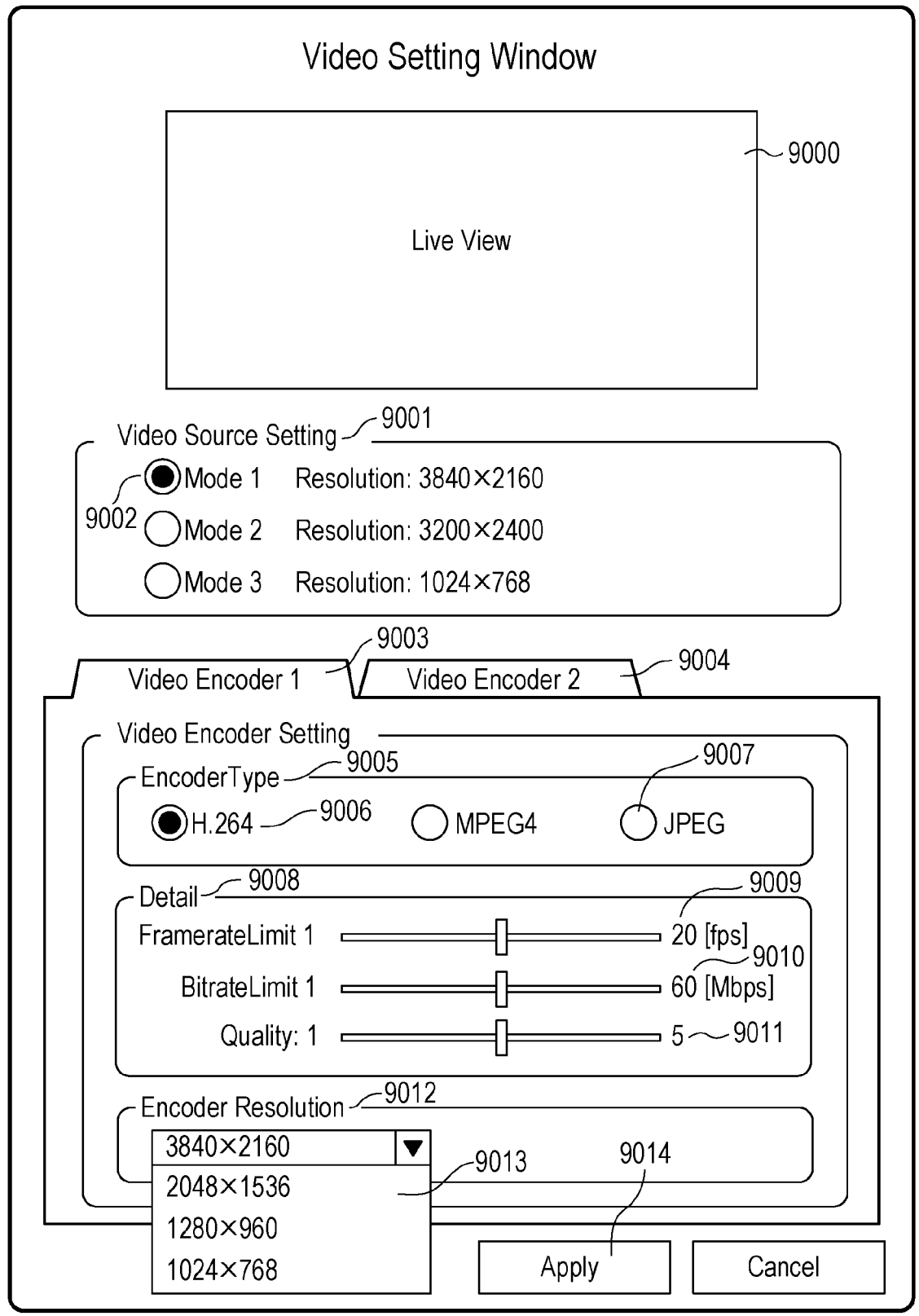
FIG. 21 is a diagram for describing a settings screen suitable for a client device which performs VSM and VEC settings of a monitoring camera 1000 according to the first embodiment of the present invention.

Next, FIG. 21 illustrates a setting screen suitable for the client device 2000 performing settings of the VSM and VEC of the monitoring camera 1000 described according to the present embodiment.

Reference numeral 9000 denotes a Live View area. When this screen is opened, the client device 2000 executes the sequence illustrated in FIG. 6 described above, and displays the video stream obtained in the transaction 7113 in the Live View area.

Reference numeral 9001 denotes a VSM selection area. The client device 2000 determines whether or not the monitoring camera 1000 is compatible with VSM switching, by the GetServiceCapabilities transaction 7099 executed in conjunction with opening this setting screen. If compatible, the VSMs obtained by the GetVideoSourceMode transaction 7200 are listed in this area so that the user can select one, as indicated by 9002. Upon a VSM different from that currently set is selected in this area, the client device 2000 executes the SetVideoSourceMode command to change the VSM of the monitoring camera 1000.

At this time, the client device 2000 executes the transaction illustrated in FIG. 7 described above, and a video stream according to the new settings is displayed on the Live View area 9000. The client device 2000 uses the results obtained by the GetVideoEncoderConfigurationOptions command in the transaction in FIG. 7 to update the options and setting ranges of the parameters for Video Encoder in this screen. The client device 2000 can thus constantly provide the user with options and setting ranges for the VEC settings values which are consistent with the VSM.

Reference numerals 9003 and 9004 denote tabs to switch the Video Encoding setting screen, so that the user can change the settings values of the VEC 6103 of the monitoring camera 1000. While the number of tabs is two in this example, an arrangement may be made where as many are displayed as the number of VECs 6103, obtained by the GetVideoEncoderConfigurations command, which the monitoring camera 1000 supports.

Reference numeral 9005 denotes an area for the user to select the compression encoding format of each VEC. The options are displayed for the compression encoding format Encoding obtained by the GetVideoEncoderConfigurationOptions included in the transaction in FIG. 6 when this setting screen is opened.

Alternatively, the options are displayed for the compression encoding format Enrcording obtained by the GetVideoEncoderConfigurationOptions command included in the transaction in FIG. 7 when a new VSM is selected in the VSM selection area.

Reference numeral 9006 denotes currently selectable Encodring, 9007 denotes currently non-selectable Encordring.

Reference numeral 9008 denotes a Detail area for selecting the FramerateLimit, BitrateLimit, and Quality, included in the VEC 6103. Setting ranges 9009, 9010, and 9011 reflect the setting ranges each obtained by the GetVideoEncoderConfigurationOptions command included in FIG. 6 when this setting screen is opened.

Alternatively, these setting ranges reflect the setting ranges each obtained by the GetVideoEncoderConfigurationOptions command included in the transaction in FIG. 7 when a new VSM is selected in the VSM selection area.

Reference numeral 9012 denotes an area for selecting the resolution Resolution of the VEC 6103.

The drop-down list 9013 displays the contents of options of the Resolution parameter obtained by the GetVideoEncoderConfigurationOptions included in the transaction in FIG. 6 when this setting screen is opened.

Alternatively, the drop-down list 9013 displays the contents of options of the Resolution parameter obtained by the GetVideoEncoderConfigurationOptions command included in the transaction in FIG. 7 when a new VSM is selected in the VSM selection area.

Reference numeral 9014 denotes an Apply button. Upon the user pressing this button, the client device 2000 transmits the SetVideoEncoderConfiguration to the monitoring camera 1000. The parameters selected in 9005, 9008, and 9012 are reflected in the compression encoding unit of the monitoring camera 1000 by this transmission.

According to the embodiment above, in a case where the VSM has been changed by the client device 2000, the monitoring camera 1000 performs the following processing. That is processing to update what is in the settings of the VEC, and the options provided by the GetVideoEncoderConfigurationOptions command to those which are consistent with the VSM.

Also, at the time of updating, the monitoring camera 1000 prompts re-obtaining the contents of the VEC regardless of whether the new VSM necessitates restarting or not. This is to prevent occurrence of inconsistency in the setting values and settable ranges for the imaging unit and compression encoding unit, between the monitoring camera 1000 and the client device 2000. That is to say, even in a case where the resolution of the image data which the imaging unit generates is changed, inconsistency in the various settings including the resolution of the distribution image which the compression encoding unit generates can be prevented from occurring, so generating of distribution images after changing the resolution, and further changes to settings values, can be easily performed.

Second Embodiment

Description has been made in the first embodiment regarding a form to carry out the present invention, by way of a monitoring camera which updates the contents of settings for the compression encoding unit and the settable options so as to be consistent, in accordance with switching of the mode of the imaging unit, and prompts the client device to re-obtain the settings values.

While the first embodiment describes the types of options of resolution for the compression encoding unit provided by the GetVideoEncoderConfigurationOptions command to be restricted to those consistent with the VSM, this is not restrictive.

An arrangement may be made where options for all resolutions are provided to the client device at all times by the GetVideoEncoderConfigurationOptions command. The following processing may then be performed along with new settings values of the compression encoding unit set by the client device 2000 using the SetVideoEncoderConfiguration command.

That is to say, the monitoring camera 1000 may be configured to internally switch the VSM to a mode compatible therewith, and transmit a notification to the client device 2000 to prompt re-obtaining the updated VSM contents.

A second embodiment which takes into consideration this point will be described below. Note that portions which are the same as the first embodiment will be omitted from description.

Reference numeral 1000 in FIG. 1 is a diagram illustrating a monitoring camera according to one embodiment of the present invention. FIG. 2 is a system configuration diagram including the monitoring camera 1000. FIG. 3 is a diagram illustrating the internal configuration of the monitoring camera 1000. FIG. 4 is a diagram illustrating the structure of parameters which the monitoring camera 1000 according to the present embodiment holds. The table in FIG. 5 illustrates the VSMs which the monitoring camera 1000 supports, and the contents of the settable ranges of the VECs 6103 consistent with each VSM.

FIG. 6 illustrates a typical command sequence carried out between the monitoring camera 1000 and the client device 2000, from start of setting to video distribution.

Figure 9:
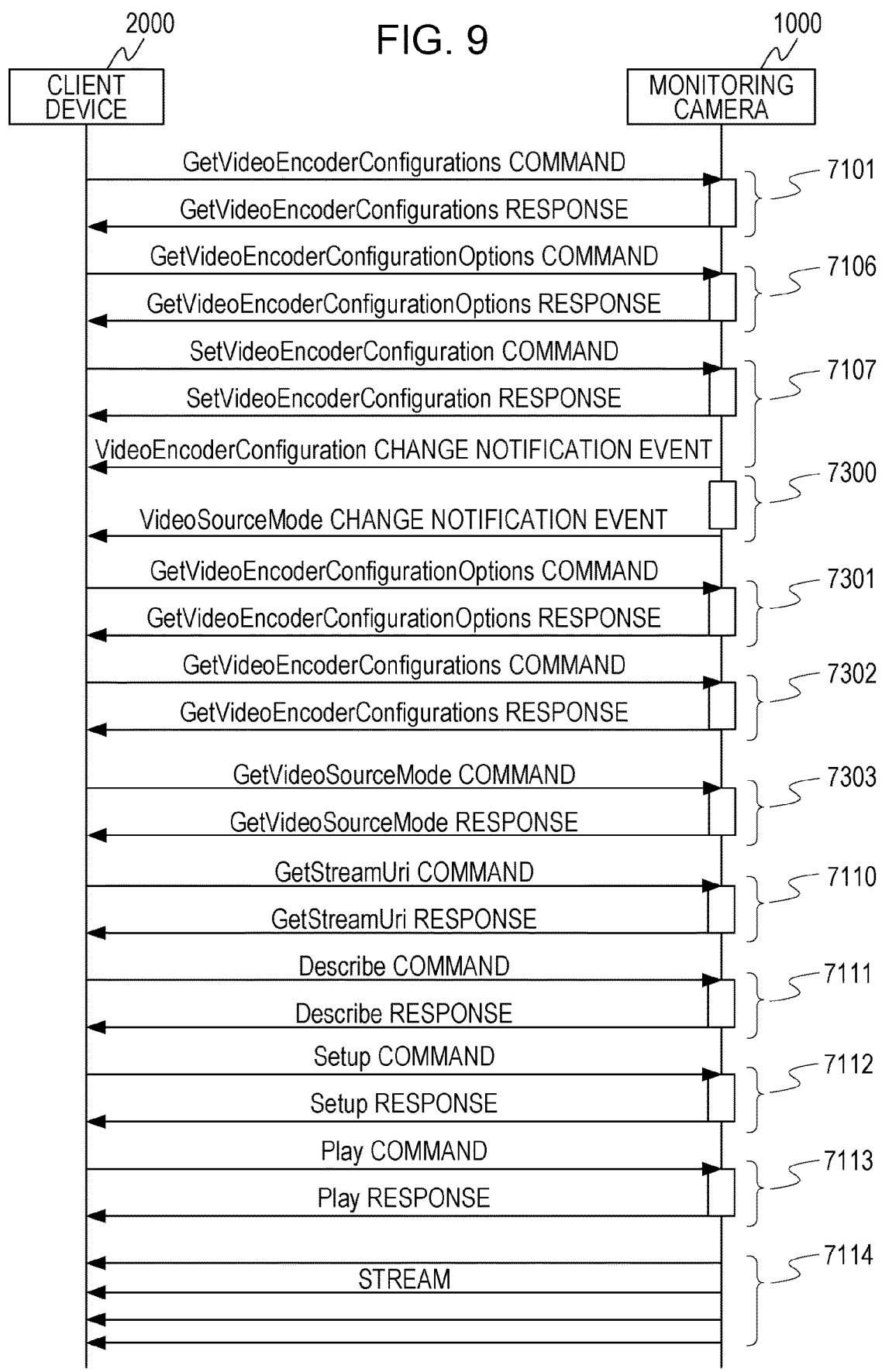
FIG. 9 illustrates a command sequence carried out between the monitoring camera and a client device, to change output resolution of a compressing encoding unit, according to a second embodiment of the present invention.

FIG. 9 illustrates a typical command sequence carried out between the monitoring camera 1000 and the client device 2000, in a case of changing the output resolution of the compression encoding unit 1004.

Reference numeral 7300 denotes processing to update the VSM, to resolve inconsistency between the VSM and VEC which has occurred due to changing the settings of the VEC as indicated by 7107. In a case where a VSM update which does not involve restarting has been performed here, the control unit 1001 of the monitoring camera 1000 transmits a VSM change notification event, to notify the client devices on the network to re-obtain the VSM.

Reference numerals 7301 and 7302 denote GetVideoEncoderConfigurationOptions command and GetVideoEncoderConfigurations command transactions. The client device 2000 which has received the VEC change notification event indicated by 7107 obtains the updated VEC settings values and VEC settings value options by these commands.

Reference numeral 7303 denotes a GetVideoSourceMode command transaction. The client device 2000 which has received the VSM change notification event indicated in 7300 can confirm updating of the VSM by referencing the Enable flag included in the updated VSM by this transaction.

Figure 10:
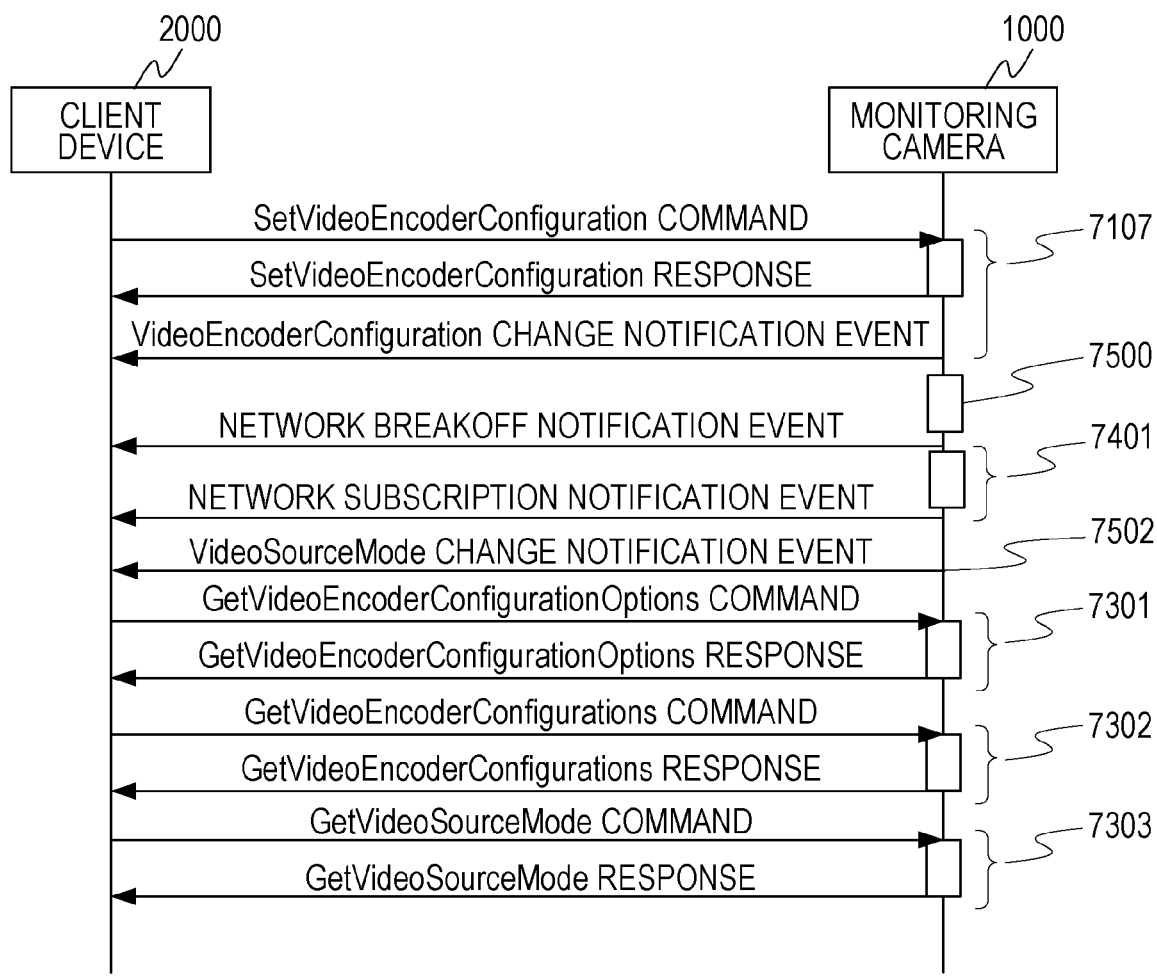
FIG. 10 illustrates a command sequence carried out between the monitoring camera and a client device, which involves restarting, according to the second embodiment of the present invention.

FIG. 10 illustrates a typical command sequence carried out between the monitoring camera 1000 and the client device 2000, in a case of changing the output resolution of the compression encoding unit 1004, and in which a VSM update occurs which involves restarting. FIG. 10 is the same as FIG. 9 regarding portions of 7107 and earlier, and 7301 and later.

Reference numeral 7500 denotes processing to update the VSM, so as to resolve inconsistency between the VSM and VEC which has occurred due to changing the settings of the VEC as indicated by 7107. In a case where a VSM update which involves restarting has been performed here, the monitoring camera 1000 does not transmit the VSM change notification event.

Reference numeral 7502 denotes a VSM change notification event. The monitoring camera 1000 transmits this event after restarting, and prompts the client device 1000 to re-obtain the settings values.

Figure 17:
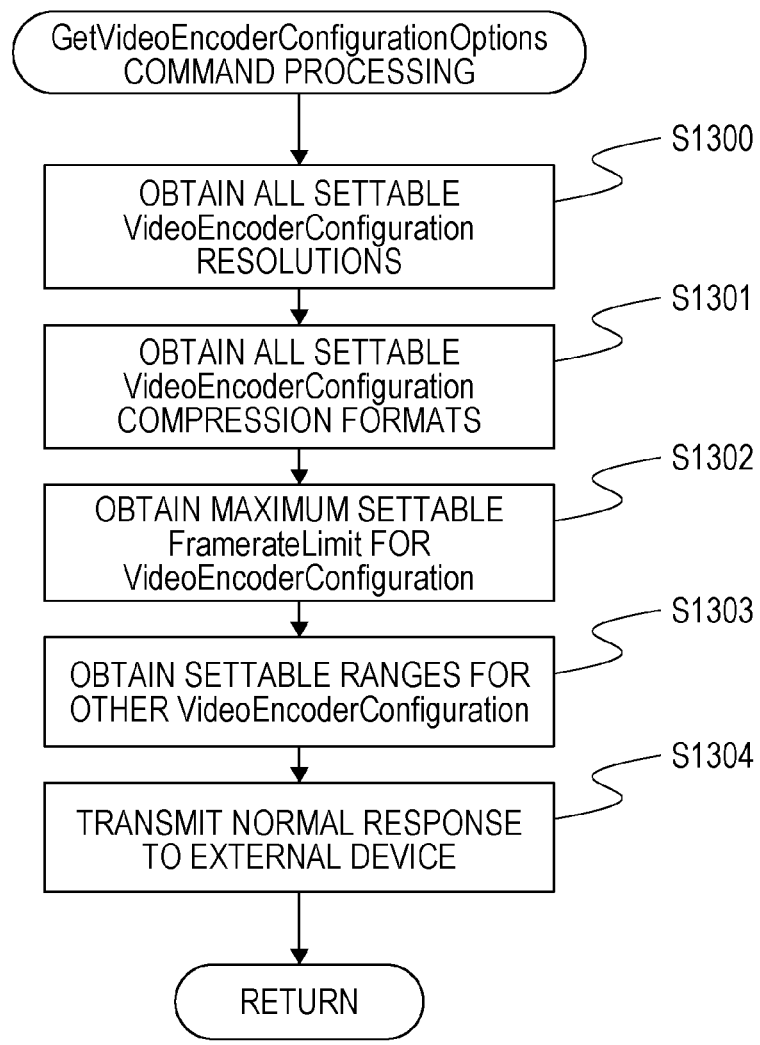
FIG. 17 is a flowchart for describing processing in a case where the monitoring camera receives a GetVideoSource- ConfigurationOptions command, according to the second embodiment of the present invention.

FIG. 17 illustrates processing in a case of the monitoring camera 1000 having received a GetVideoSourceConfigurationOptions command from the client device 2000.

In step S1300 the control unit 1001 references the table illustrated in FIG. 4, stored in the storage unit 1002, and obtains resolution options for all VECs which can be assumed, regardless of the VSM.

In step S1301 the control unit 1001 references the table illustrated in FIG. 4, stored in the storage unit 1002, and obtains compression encoding format options for all VECs which can be assumed, i.e., JPEG, MEPG4, and H.264.

In step S1302 the control unit 1001 references the table illustrated in FIG. 4, stored in the storage unit 1002, and obtains the greatest value of FramerateLimit of all VECs which can be assumed, which is 30 fps.

In step S1303 the control unit 1001 obtains options and setting ranges for VECs not dependent on the current VSM, from the storage unit 1002. For example, 1 to 5 is selected as a settable range for Quality, and 60 Mbps is obtained as a settings value for BitrateLimit.

In step S1304 the control unit 1001 includes the options and setting ranges obtained in step S1300 through step S1303 in a normal response, and returns this to the client device 2000 via the communication unit 1005.

Figure 18:
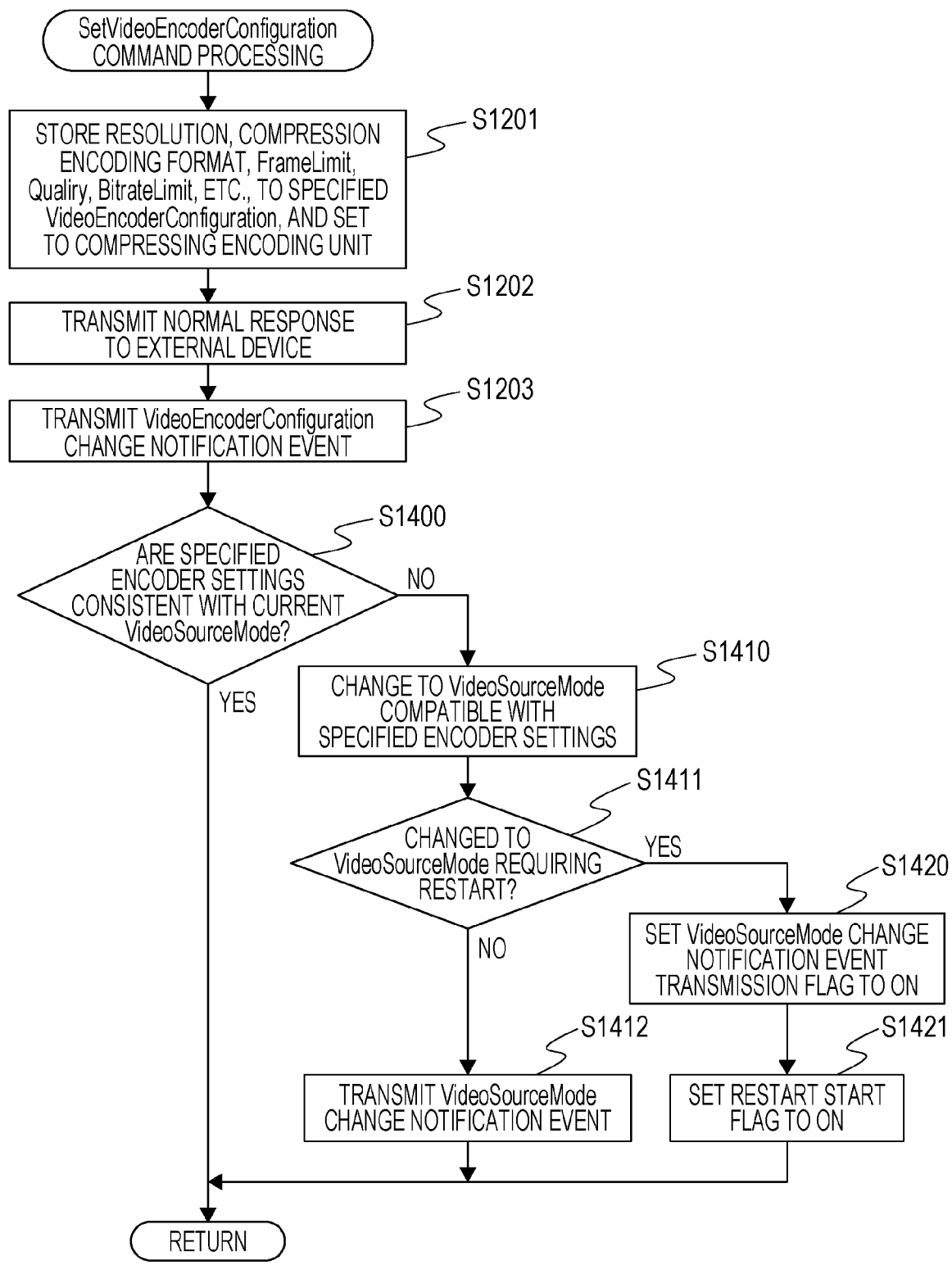
FIG. 18 is a flowchart for describing processing in a case where the monitoring camera receives a SetVideoEncorderConfiguration command, according to the second embodiment of the present invention.

FIG. 18 illustrates processing in a case where the monitoring camera 1000 has received the above-described SetVideoEncoderConfiguration command from the client device 2000.

Steps S1201 through S1203 are as described above.

In step S1400, the control unit 1001 references the table illustrated in FIG. 5, which is stored in the storage unit 1003, and determines whether or not information set in the received VEC received by this command is consistent with the current VSM. This information is the compression encoding format Encoding, resolution Resolution, and maximum frame rate FramerateLimit.

If consistent, this command processing ends. If not consistent, the control unit 1001 advances the flow to step S1410.

In step S1410, the control unit 1001 references the table illustrated in FIG. 4, stored in the storage unit 1003, and switches the current VSM to a VSM consistent with the VEC input in this command. For example, in a case where the VSM is S1 and the Resolution is input to this command as 640×480 for example, the VSM is switched to S3 which is consistent with this resolution.

In step S1411 the control unit 1001 references the RebootFlag of the VSM that has been set, and determines whether or not change has been made to a VSM which necessitates restarting. If restarting is necessary, the control unit 1001 advances the flow to step S1010, and if restarting is not necessary, to step S1005.

In step S1412 the control unit 1001 transmits a VSM change notification event via the communication unit 1005, so as to notify the client devices on the network of the VSM change.

In step S1411 the control unit 1001 references the RebootFlag of the VSM that has been updated, and determines whether or not change has been made to a VSM which necessitates restarting. If restarting is necessary, the control unit 1001 advances the flow to step S1420, and if restarting is not necessary, to step S1412.

In step S1412 the control unit 1001 transmits a VSM change notification event via the communication unit 1005, so as to notify the client devices on the network of the VSM change.

In step S1420 the control unit 1001 sets the VSM change notification event transmission flag to ON.

In step S1421 the control unit 1001 sets the restarting start flag to ON.

FIG. 16 illustrates details of restarting processing.

FIG. 21 illustrates a setting screen suitable for the client device 2000 performing settings of the VSM and VEC of the monitoring camera 1000 described according to the present embodiment.

Reference numeral 9012 denotes an area for selecting the resolution Resolution of the VEC 6103. The drop-down list 9013 displays the contents of options of the Resolution parameter obtained by the GetVideoEncoderConfiguration-Options executed when this setting screen is opened. As illustrated in FIG. 17, the monitoring camera 1000 according to the present embodiment provides all resolutions obtained from the table in FIG. 5 as options, so as a result, the drop-down list 9013 displays all resolutions.

In a case of having received a VSM change notification event transmitted in FIG. 18 or FIG. 16, the client device 2000 references the Enable flag obtained by the GetVideoSourceMode command. The client device 2000 determines the updated and valid VSM by making this reference, and reflects this in the VSM selection area 9001.

According to the second embodiment above, the monitoring camera 1000 provides the setting contents of all VECs which can be assumed as options, regardless of the current VSM, and provides these to the client device 2000. In a case where a VEC parameter inconsistent with the current VSM has been specified, including the resolution of the compression encoding unit, updating is internally made to a VSM which is consistent. Also, at the time of updating, the monitoring camera 1000 prompts re-obtaining the contents of the VSM regardless of whether the new VSM necessitates restarting or not. This is to prevent occurrence of inconsistency in the setting values and settable ranges for the imaging unit and compression encoding unit, between the monitoring camera 1000 and the client device 2000. That is to say, even in a case where the resolution of the image data which the imaging unit generates is changed, inconsistency in the various settings including the resolution of the distribution image which the compression encoding unit generates can be prevented from occurring, so generating of distribution images after changing the resolution, and further changes to settings values, can be easily performed.

Third Embodiment

In the first and second embodiments, a VSM change notification event and a VEC change notification event have been exemplarily illustrated as methods to prompt the client to re-obtain the VSM and VEC settings values and setting ranges, but this is not restrictive.

An arrangement may be made where a network breakoff notification event and network subscription notification event are transmitted at a timing at which the client is prompted to re-obtain updated parameters, thereby prompting to re-obtain setting values of the monitoring camera 1000.

A third embodiment of the present invention which takes into consideration this point will be described below. Note that portions which are the same as the first and second embodiments will be omitted from description.

Reference numeral 1000 in FIG. 1 is a diagram illustrating a monitoring camera according to one embodiment of the present invention. FIG. 2 is a system configuration diagram including the monitoring camera 1000. FIG. 3 is a diagram illustrating the internal configuration of the monitoring camera 1000. FIG. 4 is a diagram illustrating the structure of parameters which the monitoring camera 1000 according to the present invention holds. The table in FIG. 5 illustrates the VSMs which the monitoring camera 1000 supports, and the contents of the settable ranges of the VECs 6103 consistent with each VSM.

FIG. 6 illustrates a typical command sequence carried out between the monitoring camera 1000 and the client device 2000, from start of setting to video distribution.

Figure 11:
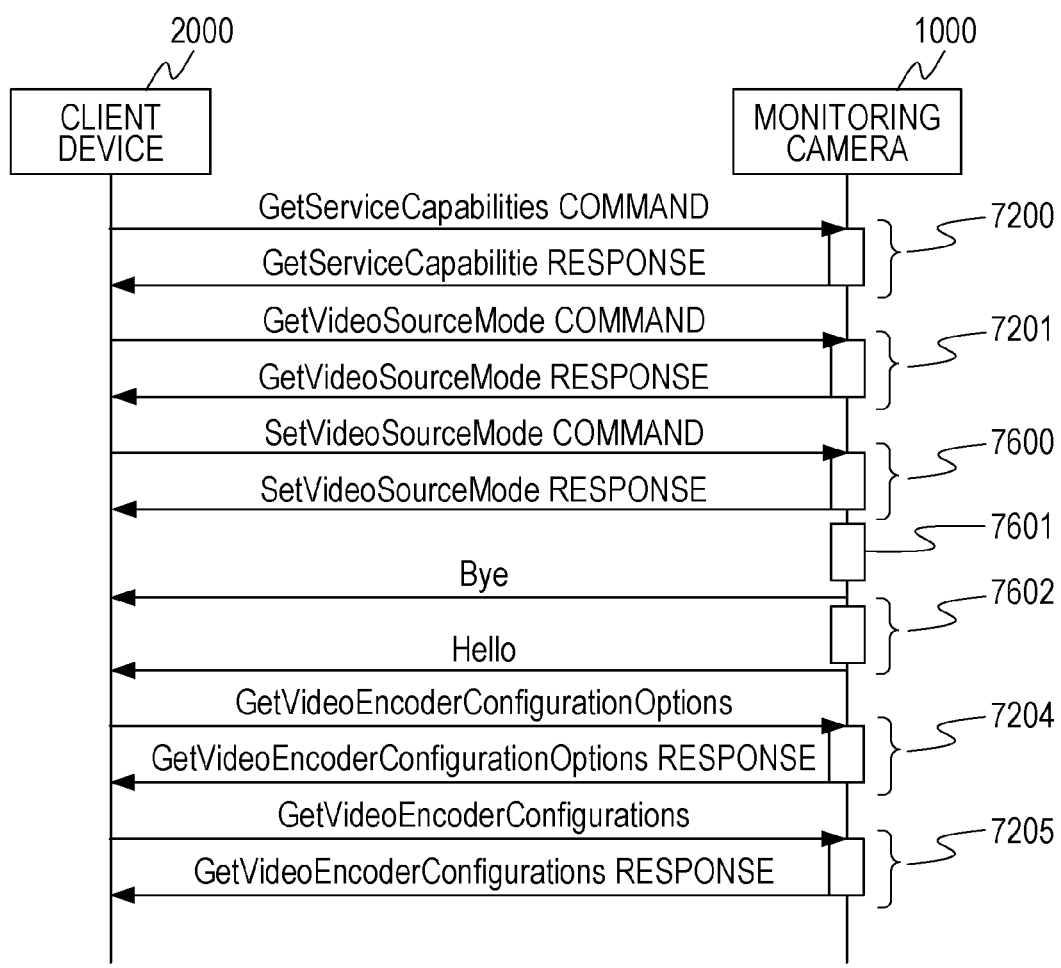
FIG. 11 illustrates a command sequence carried out between the monitoring camera and a client device, according to a third embodiment of the present invention.

FIG. 11 illustrates a typical command sequence carried out between the monitoring camera 1000 and the client device 2000, from changing VSM settings to video distribution. FIG. 11 is the same as FIG. 7 regarding portions of 7201 and earlier, and 7204 and later.

Reference numeral 7600 denotes a SetVideoSourceMode command transaction. The SetVideoSourceMode command is a command to instruct the VSM of the VideoSource 6101 which the client device 2000 has specified, to be changed.

Reference numeral 7601 denotes processing to update an inconsistency which has occurred between the VSM and VEC by the switching of the SetVideoSourceMode indicated in 7600.

Reference numeral 7602 denotes processing in which the control unit 1001 of the monitoring camera 1000 transmits a network breakoff notification event and network subscription notification event, to notify the client devices on the network of the change in VSM and VEC. In a case where the switching of VSM indicated in 7600 necessitates restarting, restarting processing of the monitoring camera 1000 may be performed between the network breakoff notification event and network subscription notification event.

Figure 12:
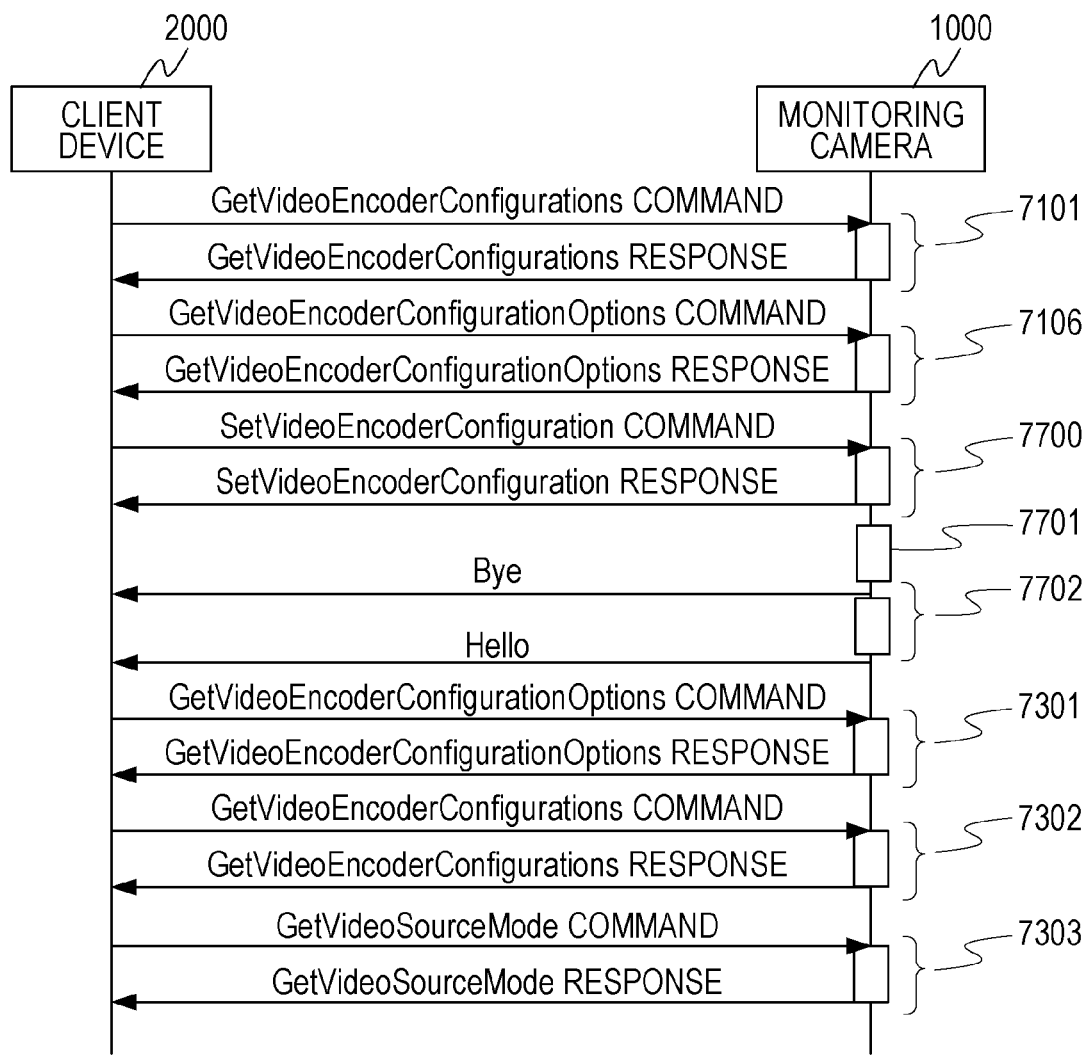
FIG. 12 illustrates a command sequence carried out between the monitoring camera and a client device, which involves changing output resolution, according to the third embodiment of the present invention.

FIG. 12 illustrates a typical command sequence carried out between the monitoring camera 1000 and the client device 2000, in a case of changing the output resolution of the compression encoding unit 1004. FIG. 12 is the same as FIG. 9 regarding portions of 7106 and earlier, and 7301 and later.

Reference numeral 7700 denotes a SetVideoEncoderConfiguration command transaction. This command causes the client device 2000 to set the parameters of the VideoEncdorConfiguration 6103.

Reference numeral 7701 denotes processing to update the VSM so as to resolve an inconsistency which has occurred between the VideoSurceMode and VEC by changing the settings of the VEC indicated in 7700.

Reference numeral 7702 denotes processing in which the control unit 1001 of the monitoring camera 1000 transmits a network breakoff notification event and network subscription notification event, to notify the client devices on the network of the change in VSM and VEC. In a case where the switching of VSM indicated in 7701 necessitates restarting, restarting processing of the monitoring camera 1000 may be performed between the network breakoff notification event and network subscription notification event.

FIG. 17 illustrates processing in a case where the monitoring camera 1000 has received a GetVideoSourceConfigurationOptions command from the client device 2000.

Figure 19:
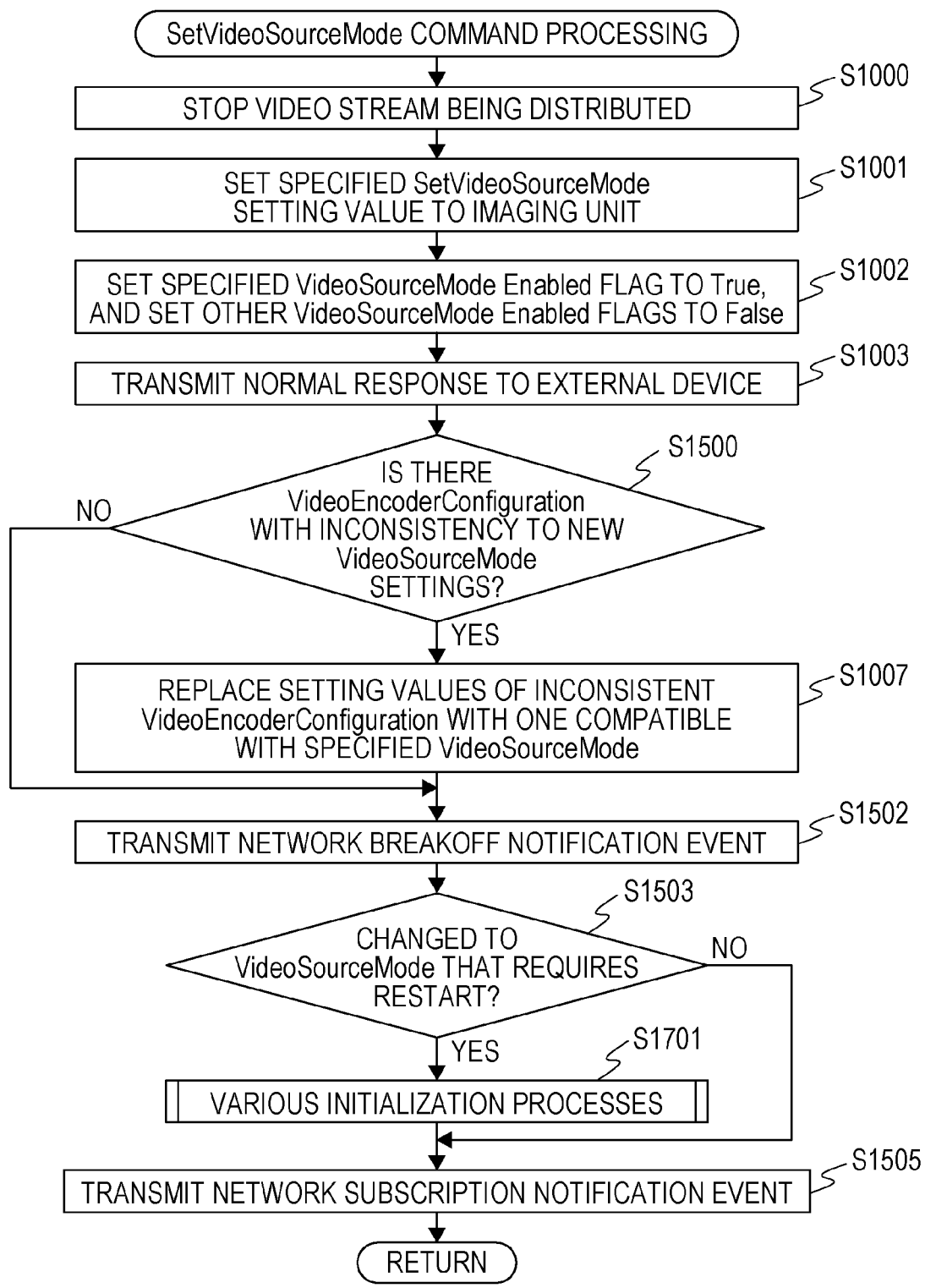
FIG. 19 is a flowchart for describing processing in a case where the monitoring camera receives a GetVideoSource command, according to the third embodiment of the present invention.

FIG. 19 illustrates processing in a case where the monitoring camera 1000 has received a SetVideoSource command from the client device 2000. S1503 and earlier in this drawing is the same as in FIG. 13.

In step S1500, the control unit 1001 performs the same determination as in step S1006. In a case where there is even one VEC incompatible with these options, the control unit 1001 advances the flow to S1007, and otherwise advances the flow to S1502.

In step S1502 and step S1505, the control unit 1001 transmits, via the communication unit 1005, a network breakoff notification event and network subscription notification event, to notify the client devices on the network of the changes to the VSM and VEC. In step S1503, the control unit 1001 references the RebootFlag of the VSM that has been set, and determines whether or not the VSM has been changed to a VSM which necessitates restarting. In a case where restarting is necessary, the control unit 1001 executes step S1701, and if restarting is unnecessary advances the flow to step S1505.

Figure 20:
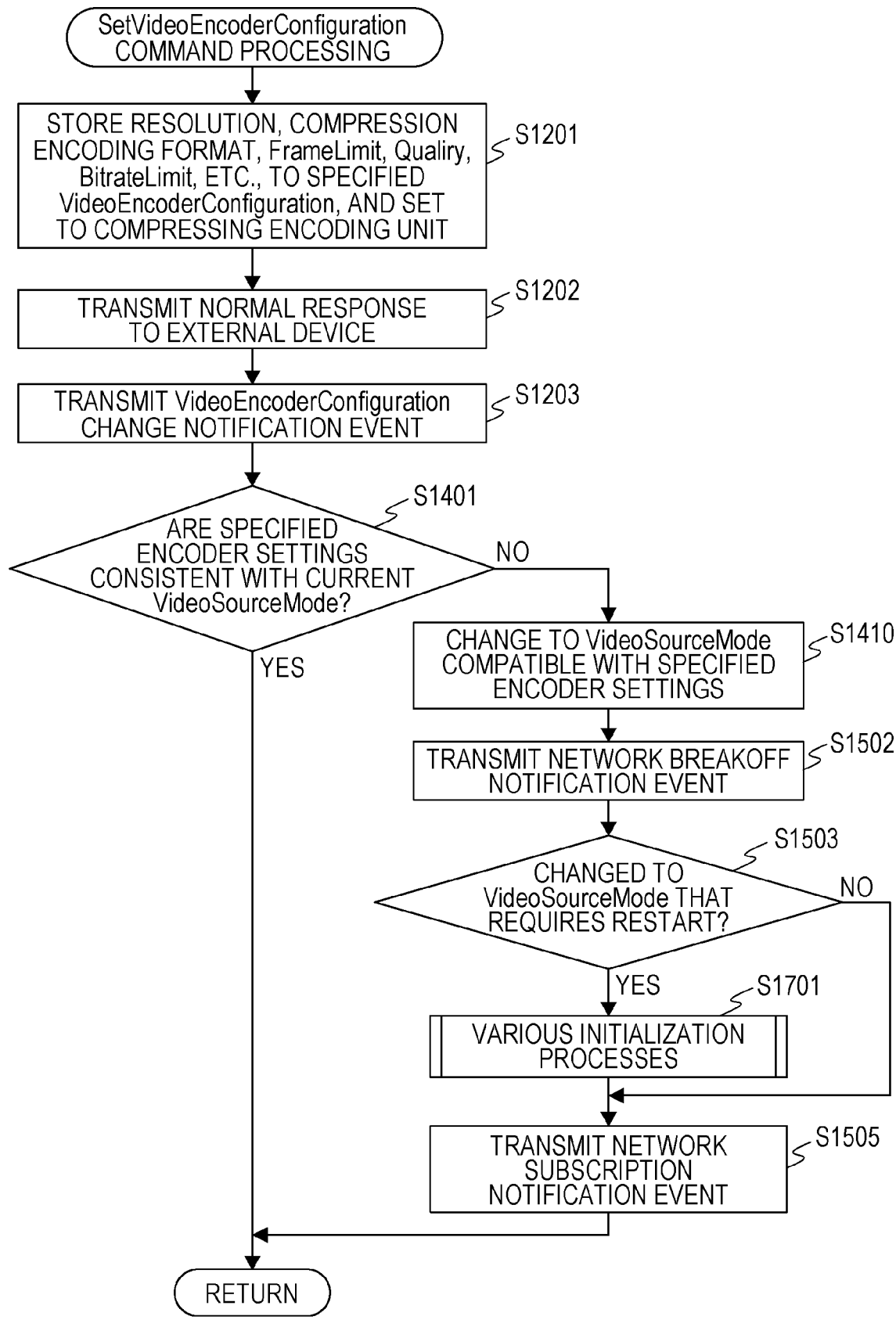
FIG. 20 is a flowchart for describing processing in a case where the monitoring camera receives a SetVideoEncorderConfiguration command, according to the third embodiment of the present invention.

FIG. 20 illustrates processing in a case where the monitoring camera 1000 has received a SetVideoEncoderConfiguration command from the client device 2000. The processing of each step is the same as described above, so description will be omitted.

FIG. 21 illustrates a setting screen suitable for the client device 2000 performing settings of the VSM and VEC of the monitoring camera 1000 described according to the present embodiment.

According to the third embodiment above, in a case where one or the other of the VSM and VEC has been changed by the client device 2000, the monitoring camera 1000 updates the other consistent contents. Also, at the time of updating, the monitoring camera 1000 transmits network breakaway and network subscription notification events to the client device 2000 regardless of whether or not restarting is necessary. This is to prevent occurrence of inconsistency in the setting values and settable ranges for the imaging unit and compression encoding unit, between the monitoring camera 1000 and the client device 2000. That is to say, even in a case where the resolution of the image data which the imaging unit generates is changed, inconsistency in the various settings including the resolution of the distribution image which the compression encoding unit generates can be prevented from occurring, so generating of distribution images after changing the resolution, and further changes to settings values, can be easily performed.

Fourth Embodiment

An embodiment where media data including video generated by the monitoring camera 1000 can be stored in the storage unit 1002 of the monitoring camera 1000 will be described in the present embodiment. Note that portions which are the same as the first, second, or third embodiments will be omitted from description.

Figure 22:
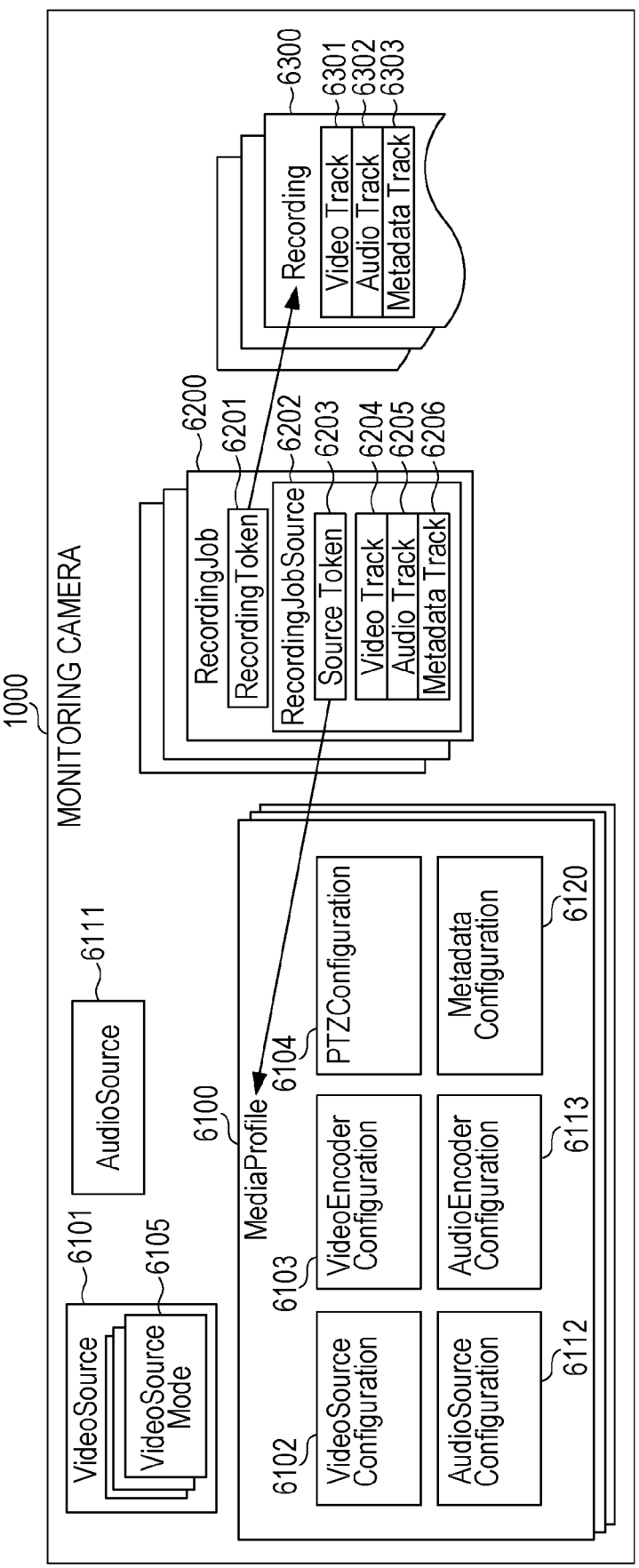
FIG. 22 is a diagram for describing the structure of parameters which the monitoring camera holds, according to a fifth embodiment of the present invention.

FIG. 22 illustrates the structure of parameters which the monitoring camera 1000 according to the present embodiment holds. The names and contents of the commands, parameters, and so forth, which are used in the present embodiment, will be described below.

A RecordingJob 6200 is a set of parameters specifying correlation of media data to be recorded as specified by a Profile Token, and Rcording which is a recording destination file specified by a later-described Recording Token. Note that RecordingJob 6200 in the present embodiment corresponds to a recording job.

A Recording 6300 is a file to record media data correlated by the RecordingJob 6200. Data to be recorded is specified from video data, audio data, and metadata, by adding or deleting each of the three tracks of Video Track 6301, Audio Track 6302, and Metadata Track 6303.

Note that the Metadata Track 6304 according to the present embodiment corresponds to text data. The Recording 6300 according to the present embodiment corresponds to a recording file.

Selection of the Recording 6300 is performed by a Recording Token which is an ID of each Recording.

The RecordingJob 6200 is made up of a Recording Token which specifies a recording destination file, and a RecordingSource 6202 which specifies metadata for recording. Further, the RecordingJob 6200 is also made up of a Mode to externally instruct start/stop of recording, Priority which indicates priority of recording, and State which indicates the state of recording of video recording.

Now State is indicated by one of Idle which indicates that recording is stopped, Active which indicates that recording is being performed, and Error which indicates that an abnormality has occurred. Multiple of RecordingSource 6202 can be specified for a RecordingJob 6200.

Note that the RecordingSource 6202 according to the present embodiment is equivalent to a recording source. Also, State in the present embodiment is equivalent to a recording state.

The RecordingSource 6202 is made up of a Source Token which specifies the output source of the media data to be recorded by a Profile Token. The RecordingSource 6202 further is also made up of a State which indicates whether the RecordingSource 6202 is currently being used for recording, and a Video Track 6204 to select the type of media data to be recorded.

Moreover, the RecordingSource 6202 is also made up of an Audio Track 6205 and Metadata Track 6206. The Tracks 6204, 6205, and 6206 each hold a State indicate whether currently being used for recording. The State of the RecordingSource, and States of Video Track, Audio Track, and Metadata Track, are each indicated by the following. That is, Idle which indicates not being used for recording, Active which indicates that recording is being performed, and Error which indicates that an abnormality has occurred.

Note that Idle and Error according to the present embodiment correspond to states other than recording being performed.

Figure 23:
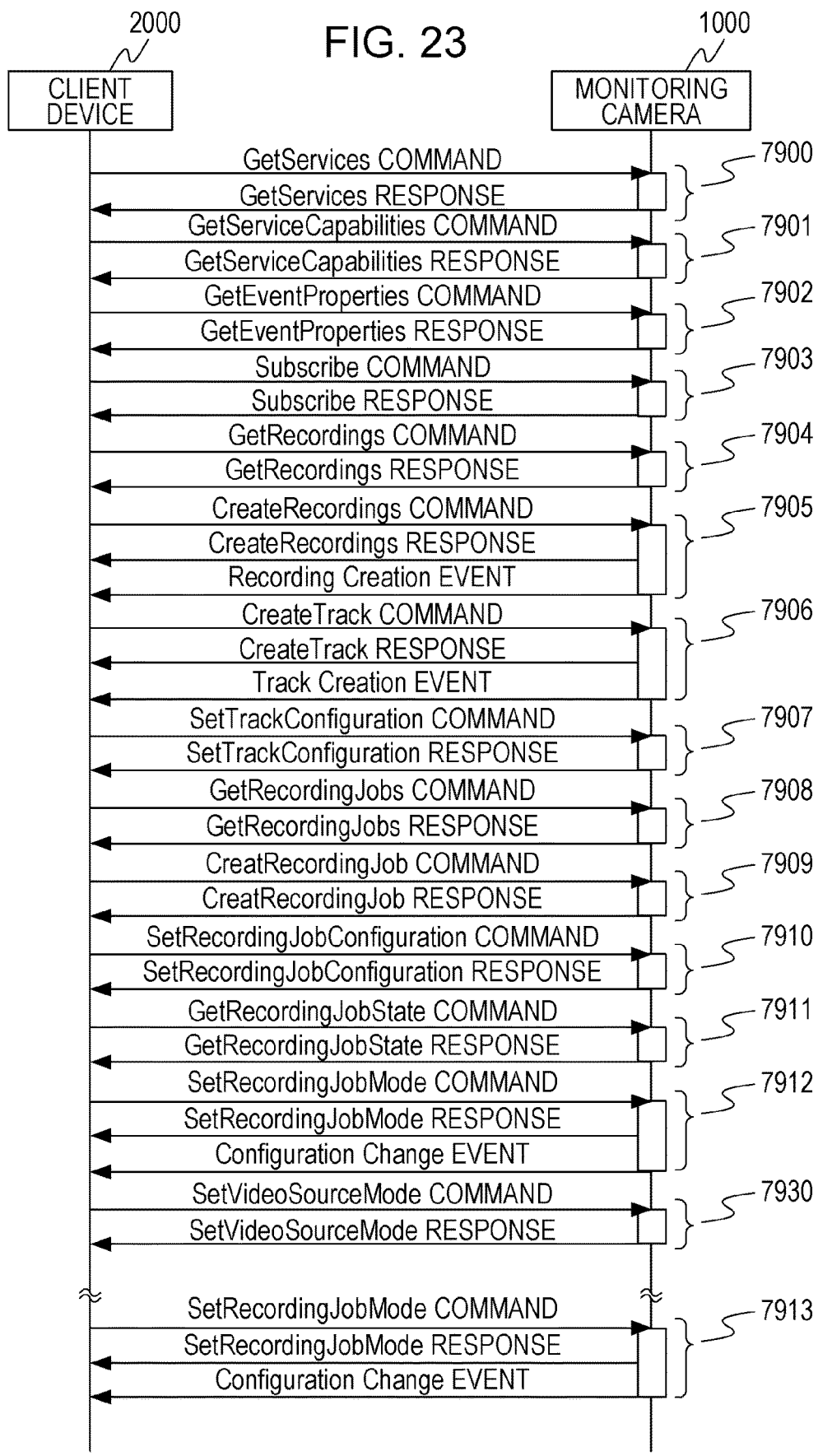
FIG. 23 illustrates a command sequence carried out between the monitoring camera and a client device, according to the fifth embodiment of the present invention.

FIG. 23 represents a typical command sequence between the monitoring camera 1000 and client device 2000, from starting of settings to performing recording. Settings of the MediaProfile 6100 in the monitoring camera 1000 are assumed to have already been performed in the command sequence in FIG. 6.

Reference numeral 7900 denotes a GetServices command transaction. The GetServices command is a command which instructs to return capabilities which the monitoring camera 1000 supports, one service at a time. Returned information includes information indicating whether or not the monitoring camera 1000 can provide service relating to recording of media data.

Reference numeral 7901 denotes a GetServicesCapabilities command transaction. The GetServicesCapabilities command is a command which instructs to return capabilities information indicating capabilities which the monitoring camera 1000 supports. The capabilities information includes information regarding whether or not the monitoring camera 1000 can handle later-described generating/deleting of Recording and generating/deleting of Track, and so forth.

Reference numeral 7902 denotes a GetEventProperties command transaction. The GetEventProperties command is a command which provides the types of event notifications which the monitoring camera 1000 supports.

Reference numeral 7903 denotes a Subscribe command transaction. The Subscribe command is a command which instructs distribution of an event which the monitoring camera 1000 supports. The client device 2000 executes the Subscribe command beforehand, and thus can receive later-described TrackCreation events and ConfigurationChange events from the monitoring camera 1000.

Reference numeral 7904 denotes a GetReoordings command transaction. The GetRecordings command is a command to return a list of Recording 6300 which the monitoring camera 1000 holds. The monitoring camera 1000 returns a Recording Token for all Recording 6300 saved in the storage unit 1002.

Reference numeral 7905 denotes a CreateRecordings command transaction. The CreateRecordings command is a command instructing the monitoring camera 1000 to create a new Recording 6300. Upon creating a new Recording, the monitoring camera 1000 transmits a RecordingsCreation event.

Reference numeral 7906 denotes a CreateTracks command transaction. The CreateTracks command is a command which gives the following instructions regarding a specified Recording 6300 of the monitoring camera 1000. That is, a Video Track 6301, Audio Track 6302, or Metadata Track 6303, is to be created as necessary.

Upon a new Track being created, the monitoring camera 1000 transmits a TrackCreation event.

Reference numeral 7907 denotes a SetTrackConfiguration command transaction. The settings values of Track of a specified Recording 6300 can be changed by the SetTrackConfiguration command.

Reference numeral 7908 denotes a GetRecordingJobs command transaction. The GetRecordingJobs command is a command to return a list of RecordingJob 6200 which the monitoring camera 1000 holds. The monitoring camera 1000 returns a list of all RecordingJob 6200 saved in the storage unit 1002.

Reference numeral 7909 denotes a CreateRecordingJob command transaction. The CreateRecordingJob command is a command to cause the monitoring camera 1000 to create a new RecordingJob 6200.

Reference numeral 7910 denotes a SetRecordingJobConfiguration command transaction. The settings values of a specified RecordingJob 6200 can be changed by the SetRecordingJobConfiguration command.

Reference numeral 7911 denotes a SetRecordingJobConfiguration command transaction. The settings values of a specified RecordingJob 6200 can be changed by the SetRecordingJobConfiguration command.

Reference numerals 7912 and 7913 denote SetRecordingJobMode command transactions. A SetRecordingJobMode command is a command which instructs the monitoring camera 1000 to start or stop recording, but switching the mode of a specified RecordingJob. For example, in a case where Mode is changed to Active in 7912, and Modeo is changed to Idle in 7913, recording between 7912 and 7913 will be performed following the settings values of the current RecordingJob 6200. While recording is being performed, the State of the RecordingJob 6200 is Active, and when recording ends becomes Idle.

Reference numeral 7930 denotes a SetVideoSourceMode command transaction. Details of processing of this command will be described in FIG. 24.

Figure 24:
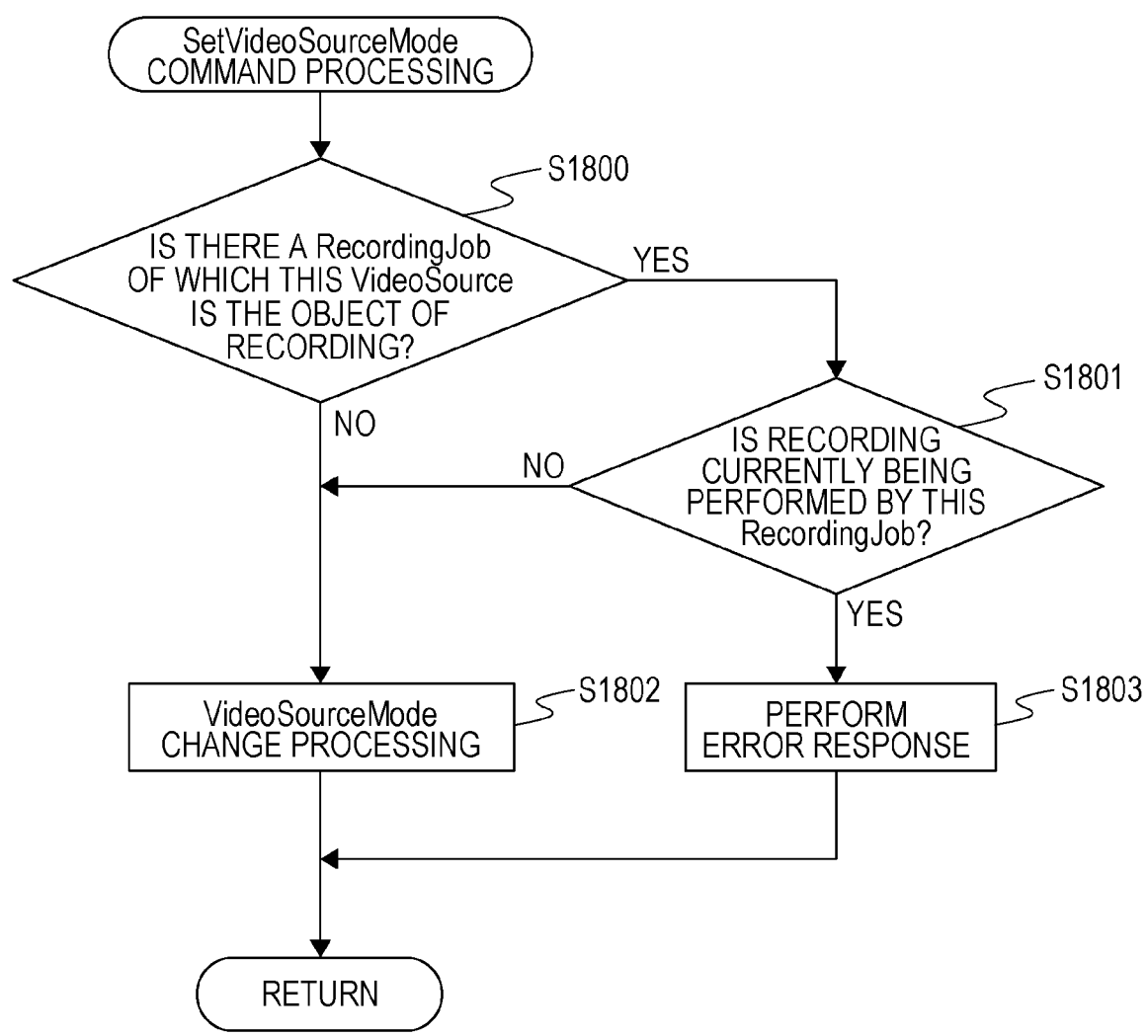
FIG. 24 is a flowchart for describing processing in a case where the monitoring camera receives a SetVideoSourceMode command, according to a fourth embodiment of the present invention.

Next, FIG. 24 illustrates processing in a case of the monitoring camera 1000 having received the SetVideoSourceMode command from the client device 2000.

In step S1800, the control unit 1001 determines whether or not there exists a RecordingJob 6200 of which a VideoSource 6101 subject to a SetVideoSourceMode command is the object of recording.

Specifically, the control unit 1001 determines whether or not a RecordingJob 6200 such as the following exists in the storage unit 1002. That is, a RecordingJob 6200 which has specified a MediaProfile 6100, including a VideoSource-Configuration 6102 which references the current VideoSource 6101, as the object of recording by a Source Token 6203.

If such does exist, the control unit 1001 determines that there is a possibility that this VideoSource will be used for recording, and advances the flow to step S1801. If such does not exist, the control unit 1001 advances the flow to S1802, and executes VideoSourceMode changing processing. This VideoSourceMode changing processing is processing indicated by step S1000 and thereafter in FIG. 13.

In step S1801, the control unit 1001 determines whether or not recording is currently being performed, regarding all RecordingJob 6200 of which the current VideoSource 6101 is the object of recording. Specifically, whether the State of the RecordingJob 6200 is Active, i.e., recording is being performed, is determined. If recording is being performed for even one, determination is made by the control unit 1001 that VideoSourceMode switching cannot be performed, and in step S1803 an error response is transmitted to the client device 2000 which is the transmission source of the command. In a case where recording is being performed for none, the control unit 1001 advances the flow to step S1802.

Figure 25:
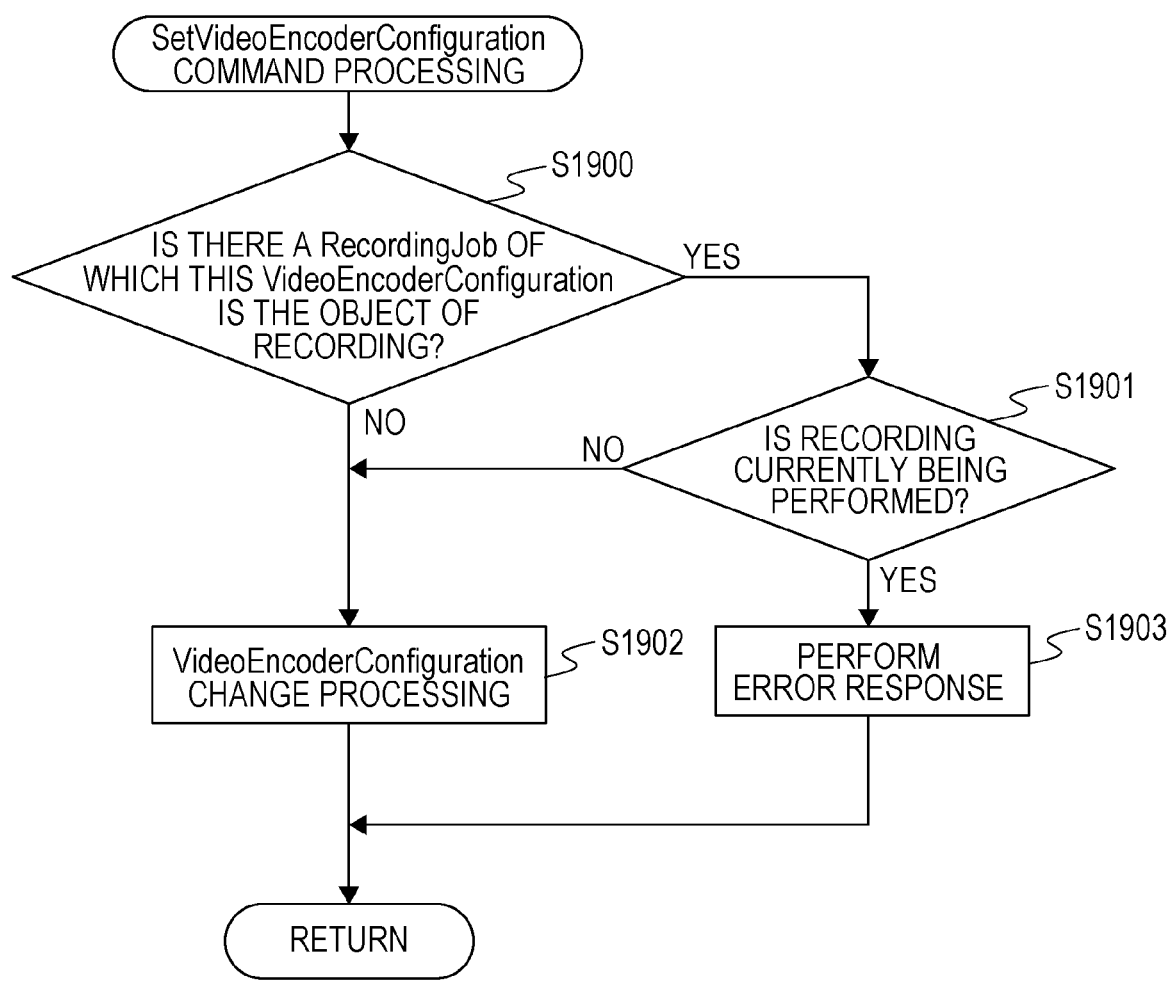
FIG. 25 is a illustrates processing in a case where the monitoring camera receives a SetVideoEncorderConfiguration command, according to the fourth embodiment of the present invention.

Next, FIG. 25 illustrates processing in a case of the monitoring camera 1000 having received the SetVideoSourceMode command from the client device 2000.

In step S1900, the control unit 1001 determines whether or not there exists a RecordingJob 6200 of which a VideoEncoderConfiguration 6103 subject to a SetVideoEncoderConfiguration command is the object of recording.

Specifically, the control unit 1001 determines whether or not a RecordingJob 6200 such as the following exists in the storage unit 1002. That is, a RecordingJob 6200 which has specified a MediaProfile 6100, including the current VideoEncoderConfiguration 6103, as the object of recording by a Source Token 6203.

If such does exist, the control unit 1001 determines that there is a possibility that this VideoEncoderConfiguration 6103 will be used for recording, and advances the flow to step S1901. If such does not exist, the control unit 1001 advances the flow to S1902 and performs VideoEncoderConfiguration changing processing. This VideoEncoderConfiguration changing processing is processing indicated by step S1200 and thereafter in FIG. 15.

In step S1901, the control unit 1001 determines whether or not recording is currently being performed, regarding all RecordingJob 6200 of which the current VideoEncoderConfiguration 6103 is the object of recording. Specifically, whether the State of the RecordingJob 6200 is Active, i.e., recording is being performed, is determined. If recording is being performed for even one, determination is made by the control unit 1001 that VideoEncoderConfiguration changing cannot be performed, and in step S1903 an error response is transmitted to the client device 2000 which is the transmission source of the command. In a case where recording is being performed for none, the control unit 1001 advances the flow to step S1902.

According to the fourth embodiment described above, the monitoring camera 1000 is controlled so as to not change a VSM or VEC being used for recording, and to change if not being used for recording. This can prevent recording from being interrupted due to inconsistency vin combination of the two. Moreover, continuous recording of monitoring data can be realized, and also multiple types of recording data are prevented from being included in a single recording data. Accordingly, video recording enabling more suitable playback can be realized.

Fifth Embodiment

In the fourth embodiment, whether or not a VSM and VEC change command can be accepted is determined based on the conditions of whether or not a RecordingJob which references a MediaProfile including the VSM and VEC is currently being recorded, but this is not restrictive. Control may be performed such that determination is made regarding whether or not the RecordingJob includes a VideoTrack as data to be recorded, and if VideoTrack is not the object of recording the VSM and VEC may be changeable even if currently recording.

Further, control may be performed such that the VSM and VEC may be changeable in the following case, even if the VideoTrack is the object of recording and the State of the RecordingJob is Active. This is a case where the State is Idle for a RecordingsSource of which the current MediaProfile is a Source Token. This is also a case where the State is Idle for a VideoTrack of the RecordingsSource of which the current MediaProfile is a Source Token.

An embodiment which realizes the above-described will be described below as a fifth embodiment. Note that portions which are the same as the first through fourth embodiments will be omitted from description.

FIG. 22 illustrates the structure of parameters which the monitoring camera 1000 according to the present embodiment holds. The names and contents of the commands, parameters, and so forth, which are used in the present embodiment, will be described below.

An AudioSource 6101 is a set of parameters indicating the capabilities of a sound collecting unit which the monitoring camera has, and includes an AudioSourceToken which is the ID of the AudioSource 6111, and a bit length parameter of audio data which the sound collecting unit can output.

An AudioSourceConfiguration 6112 is a set of parameters correlating the AudioSource 6111 of the monitoring camera with the MediaProfile 6100. An AudioEncoderConfiguration 6113 is a set of parameters correlating encoder settings relating to compression encoding of audio data with the MediaProfile 6100.

The monitoring camera 1000 performs compression encoding of audio data following parameters, such as the compression encoding format (e.g., G.711 or AAC) or bitrate or the like, set in this AudioEncoderConfiguration 6113, and distributes to the client device 2000. This audio data is audio data output based on the contents of the AudioSource 6111 and later-described AudioSourceConfiguration 6112.

Alternatively, in a case where specified as data to be recorded by RecordingJob 6200, recording is performed in Audio Track of Recording 6300 at the point that recording is started.

The AudioEncoderConfiguration 6113 specifies an AudioEncoderConfiguration Token which is the Id of the AudioEncoderConfiguration 6113.

The AudioEncoderConfiguration 6113 also specifies Encoding which specifies the compression encoding format, Quality which specifies compression encoding quality, and bitrate of the output audio. AudioEncoderConfiguration may be abbreviated to AEC.

Reference numeral 7930 denotes a SetVideoSourceMode command transaction in FIG. 23. Details of this command will be described in FIG. 27.

Figure 26:
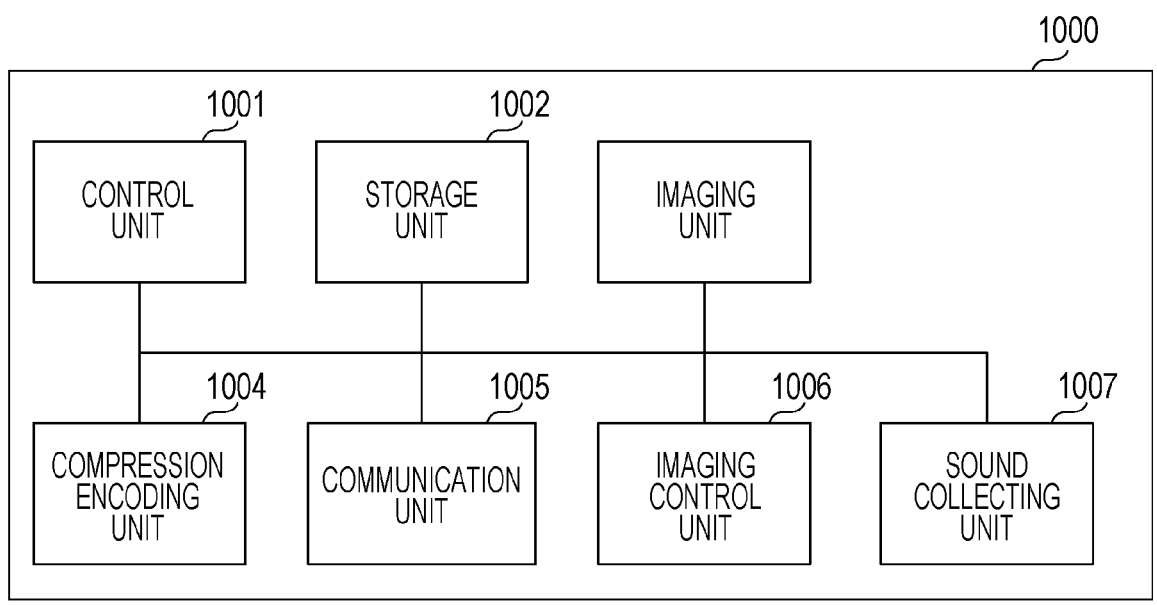
FIG. 26 is a block diagram illustrating the internal configuration of the monitoring camera according to the fifth embodiment of the present invention.

Next, FIG. 26 is a block diagram illustrating the internal configuration of the monitoring camera 1000. In FIG. 26, reference numeral 1007 denotes a sound collecting unit, and is made up of a microphone, for example. The sound collecting unit 1007 digitizes obtained audio and outputs data to the compression encoding unit 1004.

Reference numeral 1004 denotes the compression encoding unit. The compression encoding unit 1004 generates image data by performing compression encoding processing as to data output from the imaging unit 1003, based on a format such as JPEG or H.264 or the like, and outputs to the storage unit 1002. The compression encoding unit 1004 also performs compression encoding processing as to data output from the sound collecting unit 1007, based on a format such as G.711 or AAC or the like, and outputs to the storage unit 1002.

Figure 27:
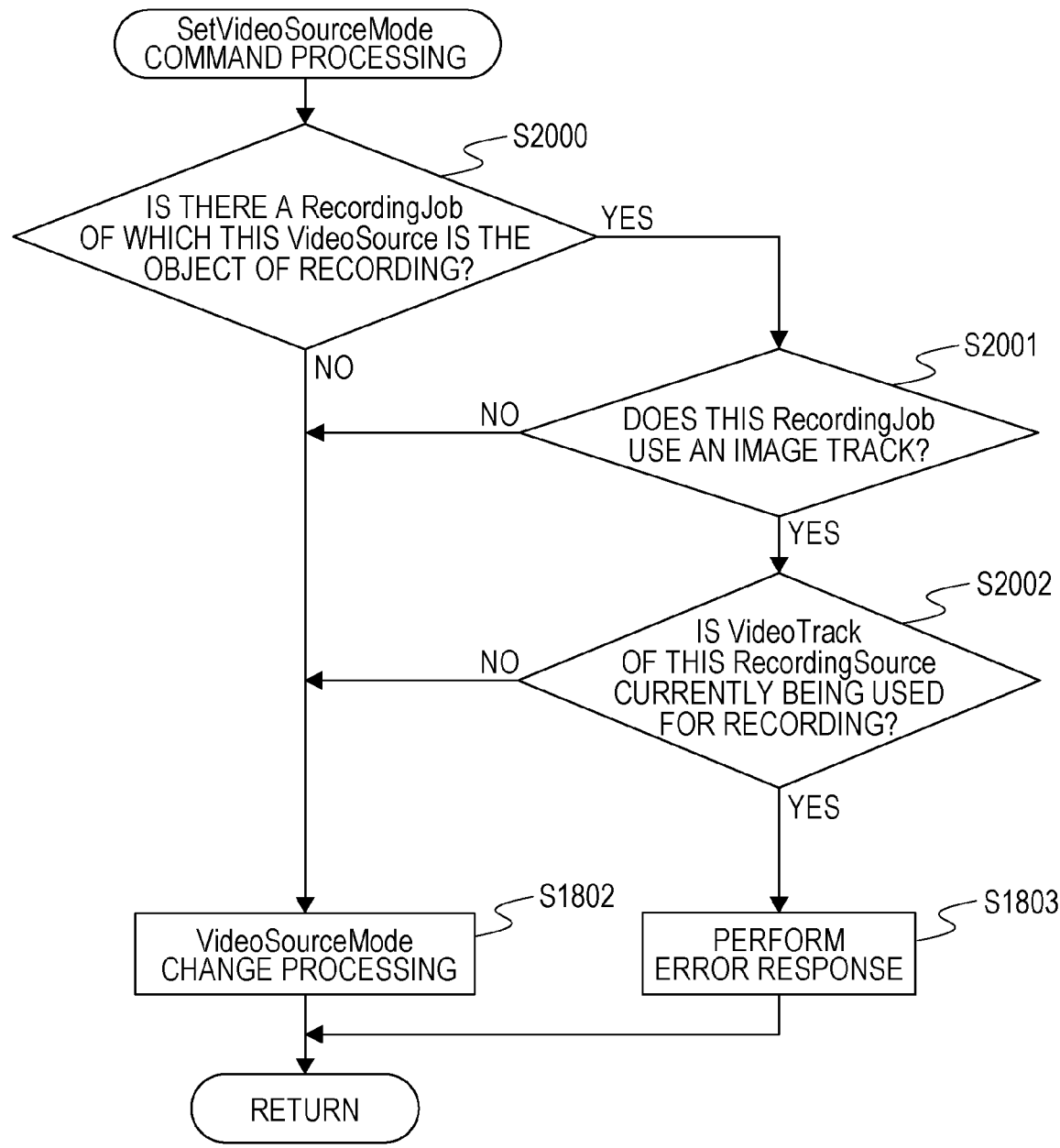
FIG. 27 is a flowchart for describing processing in a case where the monitoring camera receives a SetVideoSourceMode command, according to the fifth embodiment of the present invention.

Next, processing in a case of the monitoring camera 1000 having received the SetVideoSourceMode command from the client device 2000 will be described with reference to FIG. 27.

In step S2000, the control unit 1001 determines whether or not there exists a RecordingJob 6200 of which a VideoSource 6101 subject to a SetVideoSourceMode command is the object of recording.

Specifically, the control unit 1001 determines whether or not a RecordingSource 6202 which has specified a MediaProfile 6100 as the object of recording in a Source Token 6203, exists in any RecordingJob 6200. Note that this MediaProfile 6100 includes a VideoSourceConfiguration 6102 which references the current VideoSource 6101.

If such does exist, the control unit 1001 determines that there is a possibility that this VideoSource will be used for recording, and advances the flow to step S2001. If such does not exist, the control unit 1001 advances the flow to S1802, and executes VideoSourceMode changing processing. This VideoSourceMode changing processing is processing indicated by step S1000 and thereafter in FIG. 13.

In step S2001, the control unit 1001 determines whether or not any RecordingSource 6202 using the VideoSource found in S2000 includes a VideoTrack. In a case of not including a VideoTrack, the control unit 1001 advances the flow to S1802. If a RecordingSource 6202 including a VideoTrack exists, the control unit 1001 advances the flow to step S2002.

In step S2002, the control unit 1001 determines whether the State of the VideoTrack is Active, i.e., recording is being performed, based on a RecordingSource 6202 such as follows. That is, a RecordingSource 6202 of which the current VideoSource 6101 is the object of recording, and also includes a VideoTrack.

If recording is being performed for even one, the control unit 1001 determines that VideoSourceMode switching cannot be performed, and in step S1803 an error response is transmitted to the client device 2000 which is the transmission source of the command. In a case where recording is being performed for none, the control unit 1001 advances the flow to step S1802, where VideoSourceMode changing processing is performed.

The same processing as that in steps S2000 through S2002 is applicable to the SetVideoEncoderConfiguration command processing illustrated in FIG. 25, but description thereof will be omitted.

According to the fifth embodiment described above, the monitoring camera 1000 can accept settings changing of the VSM and VEC in cases that recording of the VideoTrack is not being performed, even in cases where recording is being performed where the VSM or VEC is being referenced by a RecordingJob. Accordingly, continuous recording of monitoring data can be realized while maximally permitting settings changes to the VSM and VEC, and also multiple types of recording data can be prevented from being included in a single recording data. Accordingly, video recording enabling more suitable playback can be realized.

Operations of a monitoring camera, application program, and client device, in which the present invention has been implemented, have been described in the first and second embodiments, but embodiments are not necessarily restricted to the above-described, and may be partially changed as follows.

(1) While an arrangement has been described where resolution options for all VECs which can be assumed are provided in step S1300, this is not restrictive. For example, an arrangement may be made where only resolutions consistent with the current VSM are provided as options, only in cases where a video stream of a certain resolution has been distributed from the monitoring camera 1000.

(2) While an arrangement has been described where a VSM is selected and switched based only on SetVideoEncoderConfiguration resolution settings in step S1410, this is not restrictive. Also, there can be conceived cases where multiple consistent VSMs exist. Accordingly, the most consistent VSM may be selected based on other multiple compression encoding unit settings such as compression encoding format, FramerateLimit, and so forth, rather than only resolution.

(3) While an arrangement has been described where compression encoding formats for all VECs which can be assumed are obtained as options in step S1301, this is not restrictive. For example, an arrangement may be made where only compression encoding format options consistent with all VSMs are obtained. Thus, while the range of provided options is narrowed, a situation can be prevented in which a compression encoding format inconsistent with the VSM selected at that point is specified by the SetVideoEncoderConfiguration command in step S1201.

(4) While an arrangement has been described where the greatest value of FramerateLimit of all VECs which can be assumed is obtained in step S1302, this is not restrictive. For example, an arrangement may be made where a greatest FramerateLimit consistent with all VSMs is obtained. Thus, while the range of provided options is narrowed, a situation can be prevented in which a FramerateLimit inconsistent with the VSM selected at that point is specified by the SetVideoEncoderConfiguration command in step S1201.

(5) While restarting processing of the monitoring camera 1000 is mentioned in step S1701, various forms of implementation can be conceived for the restarting here. For example, this may be restarting of an execution process relating to processing of a changed VSM and VEC, or may be restarting of an operating system of the monitoring camera 1000, or the like.

(6) While an arrangement has been described regarding 7402 and 7403 in FIG. 15 where both notifications are sent following the network breakoff/subscription notification events, this is not restrictive, an the order may be inverted. In the same way, the order of VideoEncoderConfiguration change notification event included in 7107 in FIG. 10 and the VideoSourceMode change notification event in 7502, and the network breakoff/subscription notification events, may be inverted without detracting from the essence of the invention.

(7) While an arrangement has been described regarding the fifth embodiment where whether or not settings of the VSM and VEC can be changed is determined according to whether the VideoTrack is being used for recording, this is not restrictive. It is needless to say that an arrangement may be made similarly where whether or not settings of the AEC can be changed is determined according to whether the AudioTrack is being used for recording. The same holds true that an arrangement may be made where whether or not settings relating to Metadata can be changed is determined according to whether the MetadataTrack is being used for recording.

(8) Switching of whether or not settings of the VSM and VEC can be changed in step S1800 and S1801 may be performed only in cases of recording with high priority, based on recording start trigger type, or the like.

According to the imaging apparatus of the present invention, the following can be realized. That is to say, recording can be prevented from being interrupted, when resolution or the like of image data generated by the imaging unit or distribution images generated by a compression encoding unit is changed while distribution images to be generated are being recorded, due to inconsistency in combination of the two. Accordingly, continuous recording of monitoring data can be realized. Also, multiple types of recording data are prevented from being included in a single recording data, whereby video recording enabling more suitable playback can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus comprising:
   an imaging unit configured to capture an image;
   a transmission unit configured to transmit the image captured by the imaging unit to an external device connected via a network;
   a recording unit configured to record the image into a storage unit;
   a receiving unit configured to receive a request from the external device for changing a mode related to the image, the mode specifying a combination of at least maximum resolution of the image and a maximum frame rate of the image; and
   a control unit configured not to change the mode in response to the request, if the recording unit is recording the image, and to change the mode in response to the request, if the recording unit is not recording the image.

2. The imaging apparatus according to claim 1, wherein the mode specifies at least a compression encoding format and the request received by the receiving unit is for changing at least the compression encoding format.

3. The imaging apparatus according to claim 2, wherein the compression encoding format is JPEG, MPEG4 or H.264.

4. The imaging apparatus according to claim 1, wherein the parameter specifies at least an aspect ratio and the request received by the receiving unit is for changing at least the aspect ratio.

5. The imaging apparatus according to claim 4, wherein the aspect ratio is 4:3 or 16:9.

6. The imaging apparatus according to claim 1, wherein the maximum resolution is at least one of 176×144, 320× 240, 640×480, 1024×768, 1280×1024, 1600×1200 and 1920×1080.

7. The imaging apparatus according to claim 1, wherein the maximum frame rate is 20 fps or 30 fps.

8. The imaging apparatus according to claim 1, wherein the request received by the receiving unit is for changing at least the combination of at least the maximum resolution of the image and the maximum frame rate of the image.

9. The imaging apparatus according to claim 1, wherein the control unit outputs an error notice in response to the request.

10. A control method for an imaging apparatus, the method comprising:
capturing an image;
transmitting the image to an external device via a network;
recording the image into a storage unit;
receiving a request from the external device for changing a mode related to the image, the mode specifying a combination of at least maximum resolution of the image and a maximum frame rate of the image; and
not changing the mode in response to the request if the recording is being executed and changing the mode in response to the request if the recording is not being executed.

11. The method according to claim 10, wherein the mode specifies at least to a compression encoding format and the received request is for changing at least the compression encoding format.

12. The method according to claim 10, wherein the parameter specifies at least an aspect ratio and the received request is for changing at least the aspect ratio.

13. A non-transitory computer-readable recording medium storing a program for causing a computer to perform operations comprising:
capturing an image;
transmitting the image to an external device via a network;
recording the image into a storage unit;
receiving a request from the external device for changing a mode related to the image, the mode specifying a combination of at least maximum resolution of the image and a maximum frame rate of the image; and
not changing the mode in response to the request while the recording is being executed and changing the mode in response to the request if recording the image is not being executed.

14. An imaging apparatus comprising: an imaging unit configured to capture an image;
a transmission unit configured to transmit the image captured by the imaging unit to an external device connected via a network;
a recording unit configured to record the image into a storage unit;
a receiving unit configured to receive a request command from the external device for changing a set of parameters including at least a parameter of resolution of the image and a parameter of a frame rate of the image; and
a control unit configured not to change the set of parameters in response to the request command, if the recording unit is recording the image, and to change the set of parameters in response to the request command if the recording unit is not recording the image.

15. The imaging apparatus according to claim 14, wherein the control unit outputs an error notice in response to the request.

16. The imaging apparatus according to claim 14, wherein the set of parameters further includes a compression encoding format.

17. The imaging apparatus according to claim 14, wherein the set of parameters further includes an aspect ratio.

18. A control method for an imaging apparatus, the method comprising:
capturing an image;
transmitting the image to an external device via a network;
recording the image into a storage unit;
receiving a request command from the external device for changing a set of parameters including at least a parameter of resolution of the image and a parameter of a frame rate of the image; and
not changing the set of parameters in response to the request command if the recording is being executed and changing the set of parameters in response to the request command if the recording is not being executed.

19. A non-transitory computer-readable recording medium storing a program for causing a computer to perform operations comprising:
capturing an image;
transmitting the image to an external device via a network;
recording the image into a storage unit;
receiving a request command from the external device for changing a set of parameters including at least a parameter of resolution of the image and a parameter of frame rate of the image; and
not changing the set of parameters in response to the request command while the recording is being executed and changing the set of parameters in response to the request if recording the image is not being executed.

* * * * *